(12) United States Patent
Fehrmann

(10) Patent No.: US 12,281,374 B2
(45) Date of Patent: Apr. 22, 2025

(54) USE OF ALLOY CONTAINING ALUMINUM FOR ADDITIVE MANUFACTURING

(71) Applicant: Fehrmann Materials GmbH & Co. KG, Hamburg (DE)

(72) Inventor: Henning Fehrmann, Hamburg (DE)

(73) Assignee: Fehrmann Alloys GmbH & Co. KG, Hamburg (DE)

( * ) Notice: Subject to any disclaimer, the term of this patent is extended or adjusted under 35 U.S.C. 154(b) by 164 days.

(21) Appl. No.: 15/733,312

(22) PCT Filed: Dec. 21, 2018

(86) PCT No.: PCT/EP2018/086647
§ 371 (c)(1),
(2) Date: Jun. 24, 2020

(87) PCT Pub. No.: WO2019/129723
PCT Pub. Date: Jul. 4, 2019

(65) Prior Publication Data
US 2020/0325559 A1    Oct. 15, 2020

(30) Foreign Application Priority Data
Dec. 28, 2017   (EP) .................................... 17210900

(51) Int. Cl.
*C22C 21/06* (2006.01)
*B22F 10/25* (2021.01)
(Continued)

(52) U.S. Cl.
CPC .............. *C22C 21/06* (2013.01); *B22F 10/25* (2021.01); *B22F 10/28* (2021.01); *B22F 10/34* (2021.01);
(Continued)

(58) Field of Classification Search
CPC ......... C22C 21/08; C22C 21/06; B22F 10/20; B22F 2301/052; B22F 10/00; B33Y 10/00; B33Y 70/00; B33Y 80/00; C22F 1/047
See application file for complete search history.

(56) References Cited

U.S. PATENT DOCUMENTS 5,423,925 A * 6/1995 Shoji ....................... C22F 1/047
                                                                148/692
6,994,759 B1 * 2/2006 Koch ...................... C22C 21/06
                                                                148/549
(Continued)

FOREIGN PATENT DOCUMENTS

CN    104715091 A  *  6/2015
CN    107502795      12/2017
(Continued)

OTHER PUBLICATIONS

E.O. Olakanmi, R.F. Cochrane, or K.W. Dalgarno, A review on selective laser sintering/melting (SLS/SLM) of aluminium alloy powders: Processing, microstructure, and properties, Oct. 2015, Elsevier, Progress in Materials Science 74, pp. 401-477 (Year: 2015).*

(Continued)

*Primary Examiner* — Nicholas A Wang
*Assistant Examiner* — Maxwell Xavier Duffy
(74) *Attorney, Agent, or Firm* — Grüneberg and Myers PLLC

(57) ABSTRACT

An alloy includes aluminum and magnesium. A method is useful for the preparation of the alloy, and another method is useful for the preparation of a product including the alloy by additive manufacturing. Additionally, a product includes the alloy prepared by additive manufacturing. An aluminum alloy is described which allows for the preparation of (Continued)

aluminum products having good mechanical properties, in particular good tensile strength, good yield strength and good elongation.

12 Claims, 4 Drawing Sheets

(51) Int. Cl.
*B22F 10/28* (2021.01)
*B22F 10/34* (2021.01)
*B22F 10/64* (2021.01)
*B22F 10/66* (2021.01)
*C22C 21/08* (2006.01)
*B33Y 10/00* (2015.01)
*B33Y 70/00* (2020.01)
*B33Y 80/00* (2015.01)

(52) U.S. Cl.
CPC .............. *B22F 10/64* (2021.01); *B22F 10/66* (2021.01); *C22C 21/08* (2013.01); *B22F 2301/052* (2013.01); *B33Y 10/00* (2014.12); *B33Y 70/00* (2014.12); *B33Y 80/00* (2014.12)

(56) References Cited

U.S. PATENT DOCUMENTS

| | | | |
|---|---|---|---|
| 2001/0002240 A1 | 5/2001 | Suzuki | |
| 2014/0255249 A1 | 9/2014 | Abe et al. | |
| 2015/0352794 A1* | 12/2015 | Nguyen | .................. B22F 10/25 700/98 |
| 2017/0121794 A1 | 5/2017 | Lenczowski | |
| 2017/0165795 A1* | 6/2017 | Lenczowski | ......... B23K 35/288 |
| 2017/0182595 A1 | 6/2017 | Nelson et al. | |
| 2017/0292174 A1* | 10/2017 | Karabin | .................. B22F 10/34 |
| 2018/0010216 A1* | 1/2018 | Vo | .......................... B33Y 80/00 |
| 2018/0190316 A1 | 7/2018 | Kitawaki et al. | |
| 2020/0362196 A1 | 11/2020 | Fan et al. | |

FOREIGN PATENT DOCUMENTS

| | | | |
|---|---|---|---|
| GB | 2 245 591 | 1/1992 | |
| JP | H0987771 | 3/1997 | |
| JP | 2012-140709 | 7/2012 | |
| JP | 2013-129909 | 7/2013 | |
| JP | 2017186642 | 10/2017 | |
| JP | 2021508753 | 3/2021 | |
| SU | 417512 A1 * | 2/1974 | |
| WO | WO-2016034857 A1 * | 3/2016 | ............. C22C 1/026 |
| WO | 2016/190277 | 12/2016 | |
| WO | WO-2017041006 A1 * | 3/2017 | ............. B22F 10/20 |
| WO | 2017/191961 | 11/2017 | |

OTHER PUBLICATIONS https://web.archive.org/web/20170710084215/https://www.makeitfrom.com/material-properties/520.0-520.0-T4-formerly-220.0-LM10-G10A-A05200-Cast-Aluminum, 520.0 (520.0-T4, formerly 220.0, LM10, G10A, A05200) Cast Aluminum, Jul. 10, 2017 MakeItFrom.com, WayBackMachine (Year: 2017).*
Daniel E. Groteke, David V. Neff, Dross, Melt Loss, and Fluxing of Light Alloy Melts, 2008, ASM Handbook, Casting vol. 15, pp. 992-1000 (Year: 2008).*
International Search Report issued Apr. 18, 2019 in PCT/EP2018/086647.
Written Opinion issued Apr. 18, 2019 in PCT/EP2018/086647.
Anilchandra et al., Materials 2017, 10, 1011, 12 pages.
Boyko et al., "Characterization of the structure and precipitation process in Al—Mg—Si and Al—Mg—Ge casting Alloys", Jan. 1, 2015 (Jan. 1, 2015), XP055574702, Retrieved from the Internet: URL:https://depositonce.tu-berlin.de/bitstream/11303/4632/1/boyko_viktoniya.pdf on Mar. 28, 2019, 152 pages.
Japanese Office Action dated Apr. 26, 2022 in Japanese Application No. 2020-536760, with English translation, 10 pages.
Indian Examination Report issued Sep. 24, 2021 in Application No. 202017031822, with English translation, 8 pages.
Japanese Office Action issued Sep. 7, 2021 in Japanese Application No. 2020-536760, with English translation, 14 pages.
Korean Office Action dated Jul. 31, 2022, in Korean Application No. 10-2020-7021501, with English translation, 8 pages.

* cited by examiner

USE OF ALLOY CONTAINING ALUMINUM FOR ADDITIVE MANUFACTURING

CROSS-REFERENCE TO RELATED APPLICATIONS

This application is a National Stage entry under § 371 of International Application No. PCT/EP2018/086647, filed on Dec. 21, 2018, and which claims the benefit of European Application No. 17210900.1, filed on Dec. 28, 2017, the content of both of which are hereby incorporated by reference in their entireties.

BACKGROUND OF THE INVENTION

FIELD OF THE INVENTION

The present disclosure relates to an alloy containing aluminum and magnesium, a method for the preparation of said alloy, a method for the preparation of a product comprising said alloy, a product comprising said alloy, and in particular to the use of said alloy in an additive manufacturing process.

DISCUSSION OF THE BACKGROUND

The additive manufacturing, also referred to as 3D printing, is a vastly growing technology for the manufacture of metallic structures. However, the growth is slowed down by the relatively few number of different materials which may be used for such processes. The development of new materials for additive manufacturing is thus an essential basis to enlarging the field.

Aluminum alloys are broadly used in large industries, such as vehicle construction, ship construction, building industry, and engine and plant construction. The additive manufacturing allows for a high degree of freedom in the topology optimisation of workpieces, and aluminum appears to be the ideal material for weight reduction in weight optimised components. Aluminum alloys with a high ratio of stability to density are promising materials which may further increase the use of aluminum alloys in additive manufacturing. Thinner walls or even the replacement of materials having a higher specific weight reduce the amount of material used, which not only reduces the weight in the workpiece itself, but also reduces the weight of the entire vehicle, engine or plant in of multiple way. A reduction in weight, however, always results in a reduction of resources and energy, such as are reduced fuel consumption, or increased range, in our vehicle.

SUMMARY OF THE INVENTION

There is still a need for an aluminum alloy that may be used in additive manufacturing, allowing for the preparation of aluminum products having good mechanical properties, in particular good tensile strength, good yield strength and good elongation.

It has now been found out that the aluminum alloys of the present disclosure have good mechanical properties, in particular high tensile strength, high yield strength and high elongation, while allowing the use of the alloy in additive manufacturing.

In a first aspect, the present disclosure relates to an aluminum alloy comprising
a. from 9 to 14% by mass of magnesium (Mg);
b. from 0.011 to 1% by mass of titanium (Ti);
c. 0.1% by mass or less of manganese (Mn);
d. 0.1% by mass or less of iron (Fe);
e. from 0.001 to 0.1% by mass of beryllium (Be);
f. from 0.0009 to 0.2% by mass of boron (B); and
g. 1% by mass or less of silicon (Si);
with the balance being aluminum (Al);
each in relation to the total mass of the alloy composition, and wherein all compounds of the alloy add up to a total of 100% by mass.

A second aspect of the present disclosure relates to a method for the preparation of an aluminum alloy according to the first aspect as disclosed above, comprising the steps of
a. Providing a raw aluminum;
b. Heating the raw aluminum to a temperature in the range of from 650 to 800° C., preferably from 700 to 770° C.;
c. Adding Mg and Be to result in a raw alloy;
d. Optionally degassing the raw alloy;
e. Adding Ti and B to the optionally degassed raw alloy to prepare the aluminum alloy.

In a third aspect, the present disclosure relates to a method for the additive manufacture (AM) of a workpiece comprising the steps of
f. Setting a layer of aluminum powder comprising an aluminum alloy according to the first aspect, preferably in vacuo or an inert gas atmosphere;
g. Selectively melting the powder by using at least one laser beam;
h. Iterating steps f. and g. until the workpiece is finished;
i. Optionally treating the workpiece by blasting, machining, heat or other treatments.

A fourth aspect of the present disclosure relates to the use of an aluminum alloy of the first aspect in an additive manufacturing process.

A fifth aspect of the present disclosure relates to an aluminum alloy product comprising or consisting of an aluminum alloy according to the first aspect, and/or being prepared by a method according to the third aspect, wherein
i) at least parts of the product have a thickness in the range of from 1 to 23 mm, or 3 to 15 mm, or from 6 to 12 mm, or from 6 to 9 mm; or 1 to 10 mm, or 3 to 10 mm; and/or
ii) the aluminum of the product has a tensile strength of at least 290 MPa, or at least 320 MPa, or at least 360 MPa, or at least 370 MPa, or at least 380 MPa; and/or
iii) the aluminum of the product has a yield strength of at least 170 MPa, or at least 180 MPa, or at least 200 MPa, or at least 215 MPa; and/or
iv) the aluminum of the product has elongation of at least 5%, or at least 15%, or at least 20%, or at least 30%, or at least 34%.

A sixth aspect of the present disclosure relates to an aluminum alloy product prepared, obtained or obtainable by a method according to the third aspect.

DETAILED DESCRIPTION OF THE INVENTION

Figure 1:
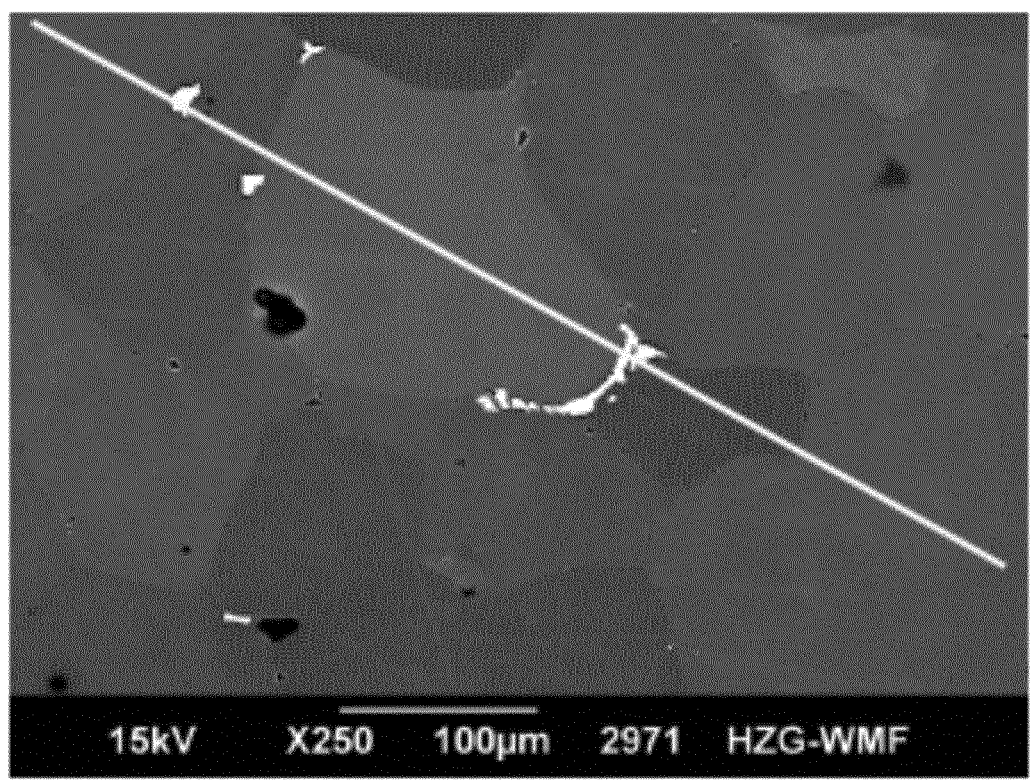
FIG. 1: Electron microscopical picture of a cross section of the sample of Example 2 after homogenization.
Figure 2A:
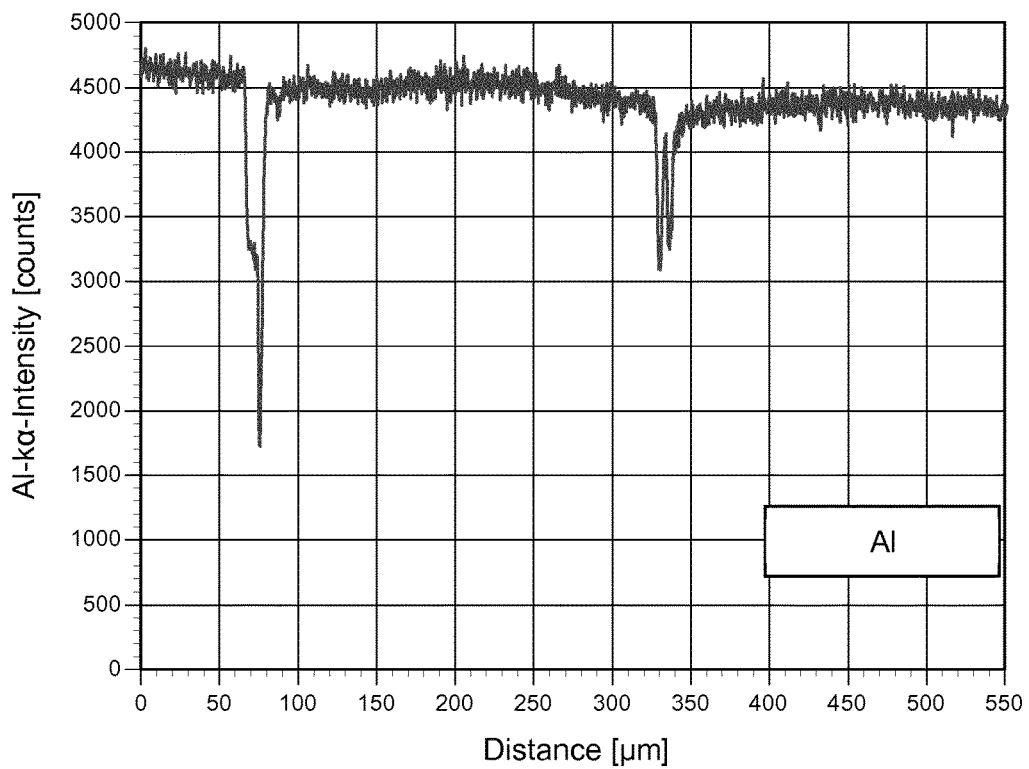
FIG. 2: EDX analysis showing distribution of a) aluminum, b) magnesium, c) iron, and d) copper along the line indicated in FIG. 1.
Figure 2B:
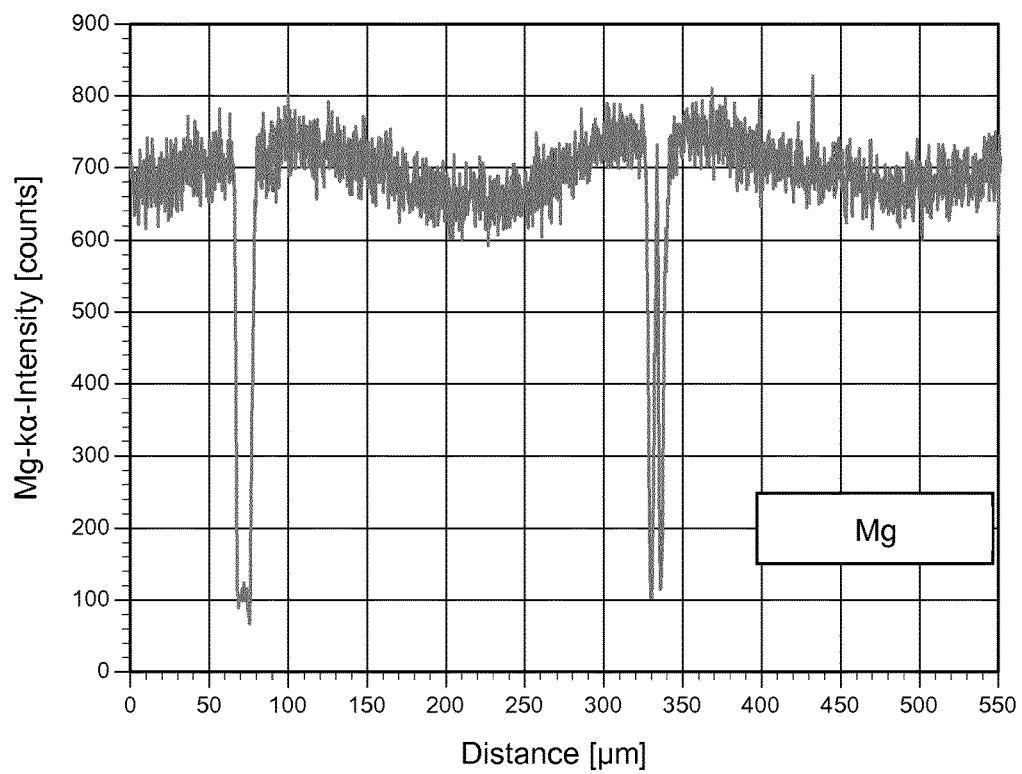
Figure 2C:
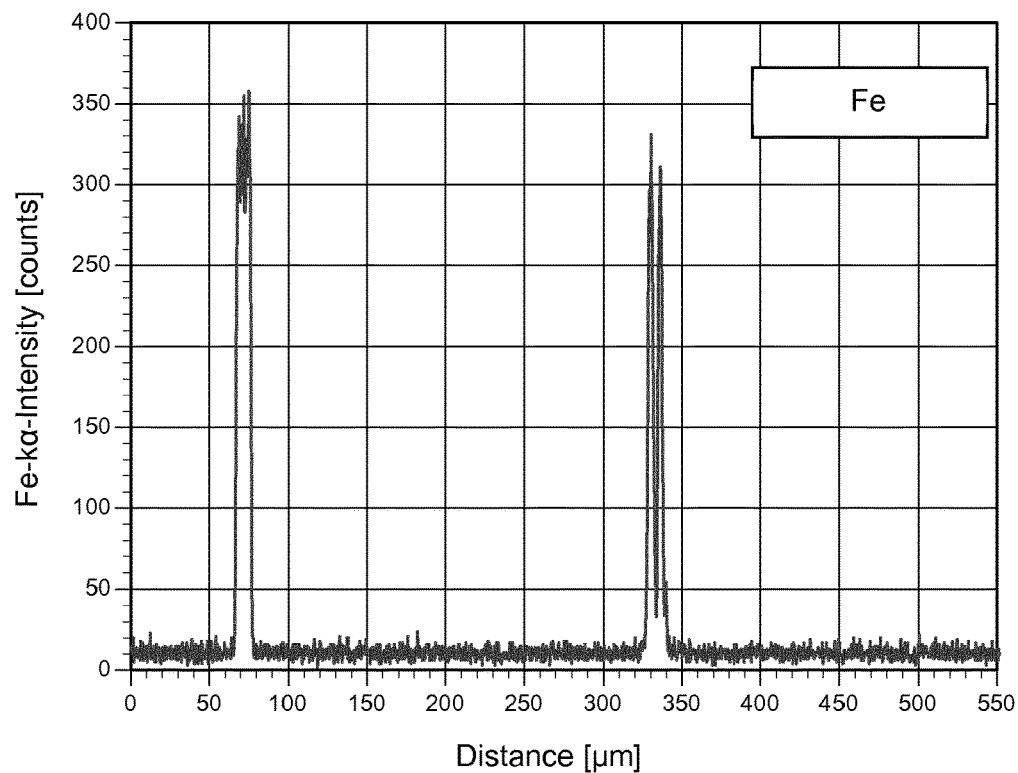
Figure 2D:
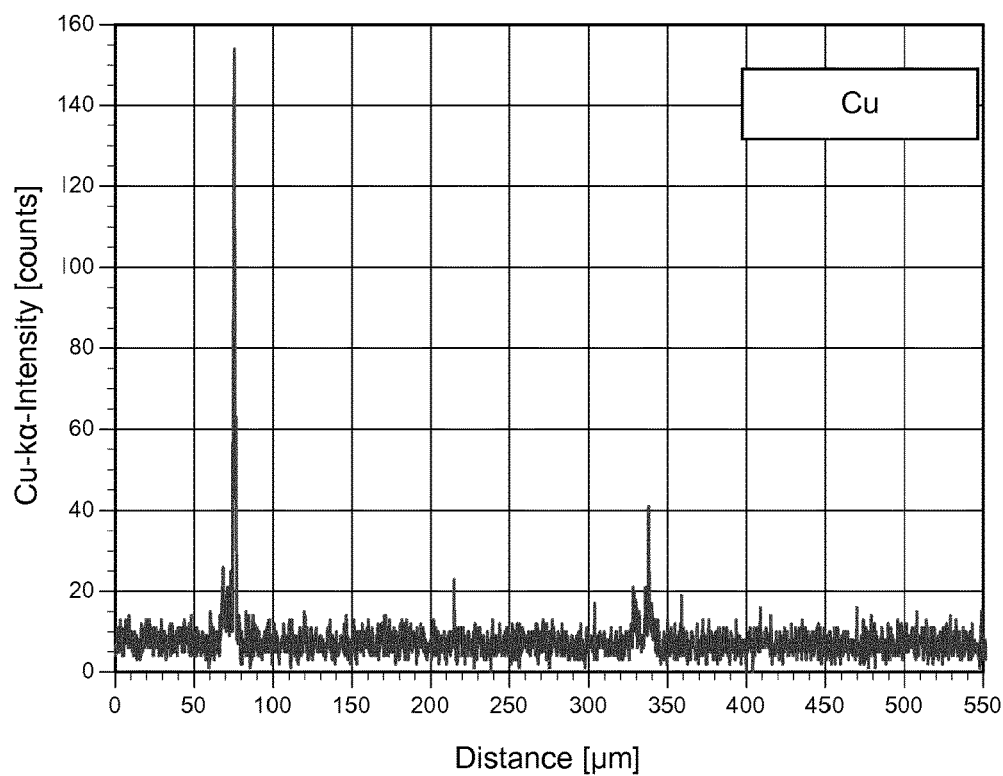

In a first aspect, the present disclosure relates to an aluminum alloy comprising a. from 9 to 14% by mass of magnesium (Mg);
b. from 0.011 to 1% by mass of titanium (Ti);
c. 0.1% by mass or less of manganese (Mn);
d. 0.1% by mass or less of iron (Fe);
e. from 0.001 to 0.1% by mass of beryllium (Be);
f. from 0.0009 to 0.2% by mass of boron (B); and
g. 1% by mass or less of silicon (Si);

with the balance being aluminum (Al);
each in relation to the total mass of the alloy composition, and wherein all compounds of the alloy add up to a total of 100% by mass.

It has been found that the aluminum alloy of the first aspect has high tensile strength ($R_m$), high yield strength ($R_{p0.2}$) and good elongation (A). In particular, when the resulting body made of the alloy of the present disclosure has a thickness in the range of from 1 to 23 mm, or from 1 to 10 mm, the material has a high tensile strength, a high yield strength and good elongation.

In a preferred embodiment of the first aspect, the aluminum alloy comprises inevitable impurities. It is known in the art that the process of preparing aluminum almost inevitably results in the presence of impurities, such as other metals. Even though the level of impurity is preferably very low, or even non-existent, the presence of impurities may be inevitable in some cases.

In a further preferred embodiment, the inevitable impurities are present in an amount of less than 0.15% by mass, or in an amount of less than 0.1% by mass, or in an amount of less than 0.05% by mass. This relates to the total amount of impurities as present in the alloy.

In another preferred embodiment, each individual impurity is present in an amount of less than 0.05% by mass, or in an amount of less than 0.01% by mass, or in an amount of less than 0.001% by mass, or in an amount of less than 0.0001% by mass. If more than one impurity is present, each impurity is termed as "individual impurity". The amount of each individual impurity is preferably less than the respective given amount, and the sum of the amounts of each individual impurity results in the total amount of impurities.

One of these individual impurities may be scandium (Sc), resulting in an amount of Sc of less than 0.05% by mass, or in an amount of less than 0.01% by mass, or in an amount of less than 0.001% by mass, or in an amount of less than 0.0001% by mass.

Another one of these individual impurities may be calcium (Ca), resulting in an amount of Ca of less than 0.05% by mass, or in an amount of less than 0.01% by mass, or in an amount of less than 0.001% by mass, or in an amount of less than 0.0001% by mass.

Still another one of these individual impurities may be chromium (Cr), resulting in an amount of Cr of less than 0.05% by mass, or in an amount of less than 0.01% by mass, or in an amount of less than 0.001% by mass, or in an amount of less than 0.0001% by mass.

Other examples of individual impurities include zirconium (Zr), vanadium (V) or phosphor (P).

As one of the essential elements, the aluminum alloy of the present disclosure contains magnesium (Mg) as a main ingredient in an amount of from 9 to 14% by mass. In a preferred embodiment of the first aspect, Mg is present in an amount of from 9.1 to 13.9% by mass, or in an amount of from 9.2 to 13% by mass, or in an amount of from 9.5 to 12% by mass, or in an amount of from 9.8 to 11% by mass, or in an amount of from 10.2 to 11.8% by mass, or in an amount of from 10.2 to 13% by mass, or in an amount of from 9.2 to 10.2% by mass, or in an amount of from 9.6 to 10.2% by mass.

Another essential element in the composition of the aluminum alloy of the present disclosure is titanium (Ti), present in an amount of from 0.011 to 1% by mass. In a preferred embodiment, Ti is present in an amount of from 0.011 to 0.9% by mass, preferably in an amount of from 0.012 to 0.8% by mass, preferably in an amount of from 0.013 to 0.5% by mass, or in an amount of 0.011% by mass or more. In another preferred embodiment, Ti is present in an amount of 0.015% by mass or more, or in an amount of 0.15% by mass or more, or in an amount of 0.2% by mass or more, or in an amount of 0.3% by mass or more. In still another preferred embodiment, Ti is present in an amount of 0.9% by mass or less, or in an amount of 0.8% by mass or less, or in an amount of 0.7% by mass or less, or in an amount of 0.6% by mass or less, or in an amount of 0.4% by mass or less.

The aluminum alloy of the present disclosure contains manganese (Mn) at an amount of 0.1% by mass or less. In a preferred embodiment, Mn is present in an amount of 0.09% by mass or less, or in an amount of 0.08% by mass or less, or in an amount of 0.04% by mass or less, or in an amount of 0.005% by mass or less. In still another embodiment, it is advantageous if small amounts of Mn are present, and is may be preferred that Mn is present in an amount of 0.0001% by mass or more, or in an amount of 0.0005% by mass or more.

Also iron (Fe) is present in the aluminum alloy of the present disclosure at low amounts of 0.1% by mass or less. In a preferred embodiment, Fe is present in an amount of 0.09% by mass or less, or in an amount of 0.08% by mass or less, or in an amount of 0.05% by mass or less, or in an amount of 0.03% by mass or less. In still another embodiment, it is advantageous if small amounts of Fe are present, and is may be preferred that Fe is present in an amount of 0.01% by mass or more, preferably in an amount of 0.05% by mass or more.

Another element in the aluminum alloy of the present disclosure—apart from aluminum—is beryllium (Be), present in an amount of from 0.001 to 0.1% by mass. In a preferred embodiment, Be is present in an amount of from 0.002 to 0.09% by mass, or in an amount of from 0.003 to 0.08% by mass, or in an amount of from 0.007 to 0.06% by mass. In another preferred embodiment, Be is present in an amount of 0.002% by mass or more, or in an amount of 0.003% by mass or more, or in an amount of 0.004% by mass or more, or in an amount of 0.005% by mass or more, or in an amount of 0.015% by mass or more. In still another embodiment, Be is present in an amount of 0.09% by mass or less, or in an amount of 0.08% by mass or less, or in an amount of 0.07% by mass or less, or in an amount of 0.06% by mass or less, or in an amount of 0.04% by mass or less.

In a preferred embodiment of the present disclosure, Ti an B are added to the aluminum alloy melt together, further preferably in bars containing Ti and B in a ration of Ti:B of 5:1. However, the ration of Ti and B in the final alloy may differ from the ratio of Ti and B when added to the melt. Without being bound to said theory, it is assumed that some of the B is removed when removing the foam from the melt. Said foam is removed as it contains agglomerated impurities which are not desired in the final alloy. It is furthermore assumed that B is enriched in said foam, in particular in relation to Ti, due to the low specific weight of B. As such, it is preferred that the ration of Ti:B in the final alloy is in the range of 5:1 to 10:1, and it is further preferred that the ratio is 5:1 or 10:1, preferably 10:1.

In a preferred embodiment of the aluminum alloy of the present disclosure, boron (B) is present in an amount of from 0.0009 to 0.2% by mass, or in an amount of from 0.001 to 0.15% by mass, or in an amount of from 0.006 to 0.1% by mass, or in an amount of from 0.01 to 0.1% by mass, or in an amount of from 0.015 to 0.05% by mass. In another preferred embodiment, B is present in an amount of 0.0009% by mass or more, or in an amount of 0.001% by mass or more, or in an amount of 0.006% by mass or more, or in an amount of 0.03% by mass or more. In still another embodiment, B is present in an amount of 0.1% by mass or less, or in an amount of 0.08% by mass or less, or in an amount of 0.07% by mass or less, or in an amount of 0.06% by mass or less, or in an amount of 0.04% by mass or less.

In another embodiment, silicon (Si) is present in an amount of 1% by mass or less, or in an amount of 0.5% by mass or less, or in an amount of 0.3% by mass or less, or in an amount of 0.2% by mass or less, or in an amount of 0.15% by mass or less, or in an amount of 0.1% by mass or less. In still another embodiment, Si is present in an amount of 0.01% by mass or more, or in an amount of 0.03% by mass or more, or in an amount of 0.05% by mass or more, or in an amount of 0.07% by mass or more.

In another embodiment, copper (Cu) is present in an amount of 0.01% by mass or less, or in an amount of 0.005% by mass or less, or in an amount of 0.003% by mass or less. In still another embodiment, Cu is present in an amount of 0.0001% by mass or more, or in an amount of 0.0005% by mass or more.

In another embodiment, zinc (Zn) is present in an amount of 0.01% by mass or less, or in an amount of 0.008% by mass or less, or in an amount of 0.007% by mass or less. In still another embodiment, Zn is present in an amount of 0.001% by mass or more, preferably in an amount of 0.003% by mass or more.

In an embodiment, the present disclosure relates to an aluminum alloy, comprising
  a. from 9 to 14% by mass of Mg;
  b. from 0.011 to 1% by mass of Ti;
  c. from 0.001 to 0.1% by mass of Be;
  d. 0.1% by mass or less of Mn;
  e. 0.1% by mass or less of Fe;
  f. from 0.0009 to 0.2% by mass of B;
  g. 1% by mass or less of Si;
  h. 0.01% by mass or less of Cu; and
  i. 0.01% by mass or less of Zn;
  with the balance being Al;
  each in relation to the total mass of the alloy composition, and wherein all compounds of the alloy add up to a total of 100% by mass; wherein the aluminum alloy comprises inevitable impurities, preferably wherein the inevitable impurities are present in an amount of less than 0.15% by mass, preferably in an amount of less than 0.1% by mass, further preferably in an amount of less than 0.05% by mass, and each individual impurity is present in an amount of less than 0.05% by mass, preferably in an amount of less than 0.01% by mass, further preferably in an amount of less than 0.001% by mass.

In an embodiment, the present disclosure relates to an aluminum alloy, comprising
  a. from 9.5 to 12% by mass of Mg;
  b. from 0.012 to 0.8% by mass of Ti;
  c. from 0.001 to 0.1% by mass of Be;
  d. 0.1% by mass or less of Mn;
  e. 0.1% by mass or less of Fe;
  f. from 0.0009 to 0.2% by mass of B;
  g. 1% by mass or less of Si;
  h. 0.01% by mass or less of Cu; and
  i. 0.01% by mass or less of Zn;
  with the balance being Al;
  each in relation to the total mass of the alloy composition, and wherein all compounds of the alloy add up to a total of 100% by mass; wherein the aluminum alloy comprises inevitable impurities, preferably wherein the inevitable impurities are present in an amount of less than 0.15% by mass, preferably in an amount of less than 0.1% by mass, further preferably in an amount of less than 0.05% by mass, and each individual impurity is present in an amount of less than 0.05% by mass, preferably in an amount of less than 0.01% by mass, further preferably in an amount of less than 0.001% by mass.

In an embodiment, the present disclosure relates to an aluminum alloy, comprising
  a. from 9.5 to 12% by mass of Mg;
  b. from 0.012 to 0.8% by mass of Ti;
  c. from 0.001 to 0.1% by mass of Be;
  d. 0.1% by mass or less of Mn;
  e. 0.1% by mass or less of Fe;
  f. from 0.0009 to 0.2% by mass of B;
  g. 0.5% by mass or less of Si, preferably in an amount of 0.3% by mass or less;
  h. 0.01% by mass or less of Cu; and
  i. 0.01% by mass or less of Zn;
  with the balance being Al;
  each in relation to the total mass of the alloy composition, and wherein all compounds of the alloy add up to a total of 100% by mass; wherein the aluminum alloy comprises inevitable impurities, preferably wherein the inevitable impurities are present in an amount of less than 0.15% by mass, preferably in an amount of less than 0.1% by mass, further preferably in an amount of less than 0.05% by mass, and each individual impurity is present in an amount of less than 0.05% by mass, preferably in an amount of less than 0.01% by mass, further preferably in an amount of less than 0.001% by mass.

In an embodiment, the present disclosure relates to an aluminum alloy, comprising
  a. from 9.5 to 12% by mass of Mg;
  b. from 0.012 to 0.8% by mass of Ti;
  c. from 0.003 to 0.08% by mass of Be;
  d. from 0.0005 to 0.08% by mass of Mn;
  e. 0.1% by mass or less of Fe;
  f. from 0.0009 to 0.2% by mass of B;
  g. 0.5% by mass or less of Si, preferably in an amount of 0.3% by mass or less;
  h. 0.01% by mass or less of Cu; and
  i. 0.01% by mass or less of Zn;
  with the balance being Al;
  each in relation to the total mass of the alloy composition, and wherein all compounds of the alloy add up to a total of 100% by mass; wherein the aluminum alloy comprises inevitable impurities, preferably wherein the inevitable impurities are present in an amount of less than 0.15% by mass, preferably in an amount of less than 0.1% by mass, further preferably in an amount of less than 0.05% by mass, and each individual impurity is present in an amount of less than 0.05% by mass, preferably in an amount of less than 0.01% by mass, further preferably in an amount of less than 0.001% by mass.

In an embodiment, the present disclosure relates to an aluminum alloy, comprising
  a. from 9.5 to 12% by mass of Mg;
  b. from 0.012 to 0.8% by mass of Ti;

c. from 0.003 to 0.08% by mass of Be;
d. from 0.0005 to 0.08% by mass of Mn;
e. from 0.001 to 0.1% by mass of Fe;
f. from 0.0009 to 0.2% by mass of B;
g. from 0.03 to 0.5% by mass of Si, preferably from 0.003 to 0.3% by mass;
h. 0.01% by mass or less of Cu; and
i. 0.01% by mass or less of Zn;
with the balance being Al;
each in relation to the total mass of the alloy composition, and wherein all compounds of the alloy add up to a total of 100% by mass; wherein the aluminum alloy comprises inevitable impurities, preferably wherein the inevitable impurities are present in an amount of less than 0.15% by mass, preferably in an amount of less than 0.1% by mass, further preferably in an amount of less than 0.05% by mass, and each individual impurity is present in an amount of less than 0.05% by mass, preferably in an amount of less than 0.01% by mass, further preferably in an amount of less than 0.001% by mass.

In an embodiment, the present disclosure relates to an aluminum alloy, comprising
a. from 10.2 to 11.8% by mass of Mg;
b. from 0.012 to 0.8% by mass of Ti;
c. from 0.001 to 0.1% by mass of Be;
d. 0.1% by mass or less of Mn;
e. 0.1% by mass or less of Fe;
f. from 0.0009 to 0.2% by mass of B;
g. 1% by mass or less of Si;
h. 0.01% by mass or less of Cu; and
i. 0.01% by mass or less of Zn;
with the balance being Al;
each in relation to the total mass of the alloy composition, and wherein all compounds of the alloy add up to a total of 100% by mass; wherein the aluminum alloy comprises inevitable impurities, preferably wherein the inevitable impurities are present in an amount of less than 0.15% by mass, preferably in an amount of less than 0.1% by mass, further preferably in an amount of less than 0.05% by mass, and each individual impurity is present in an amount of less than 0.05% by mass, preferably in an amount of less than 0.01% by mass, further preferably in an amount of less than 0.001% by mass.

In an embodiment, the present disclosure relates to an aluminum alloy, comprising
a. from 10.2 to 11.8% by mass of Mg;
b. from 0.012 to 0.8% by mass of Ti;
c. from 0.001 to 0.1% by mass of Be;
d. 0.1% by mass or less of Mn;
e. 0.1% by mass or less of Fe;
f. from 0.0009 to 0.2% by mass of B;
g. 0.5% by mass or less of Si, preferably in an amount of 0.2% by mass or less;
h. 0.01% by mass or less of Cu; and
i. 0.01% by mass or less of Zn;
with the balance being Al;
each in relation to the total mass of the alloy composition, and wherein all compounds of the alloy add up to a total of 100% by mass; wherein the aluminum alloy comprises inevitable impurities, preferably wherein the inevitable impurities are present in an amount of less than 0.15% by mass, preferably in an amount of less than 0.1% by mass, further preferably in an amount of less than 0.05% by mass, and each individual impurity is present in an amount of less than 0.05% by mass, preferably in an amount of less than 0.01% by mass, further preferably in an amount of less than 0.001% by mass.

In an embodiment, the present disclosure relates to an aluminum alloy, comprising
a. from 10.2 to 11.8% by mass of Mg;
b. from 0.012 to 0.8% by mass of Ti;
c. from 0.003 to 0.08% by mass of Be;
d. from 0.0005 to 0.08% by mass of Mn;
e. 0.1% by mass or less of Fe;
f. from 0.0009 to 0.2% by mass of B;
g. 0.5% by mass or less of Si, preferably in an amount of 0.2% by mass or less;
h. 0.01% by mass or less of Cu; and
i. 0.01% by mass or less of Zn;
with the balance being Al;
each in relation to the total mass of the alloy composition, and wherein all compounds of the alloy add up to a total of 100% by mass; wherein the aluminum alloy comprises inevitable impurities, preferably wherein the inevitable impurities are present in an amount of less than 0.15% by mass, preferably in an amount of less than 0.1% by mass, further preferably in an amount of less than 0.05% by mass, and each individual impurity is present in an amount of less than 0.05% by mass, preferably in an amount of less than 0.01% by mass, further preferably in an amount of less than 0.001% by mass.

In an embodiment, the present disclosure relates to an aluminum alloy, comprising
a. from 10.2 to 11.8% by mass of Mg;
b. from 0.012 to 0.8% by mass of Ti;
c. from 0.003 to 0.08% by mass of Be;
d. from 0.0005 to 0.08% by mass of Mn;
e. from 0.001 to 0.1% by mass of Fe;
f. from 0.0009 to 0.2% by mass of B;
g. from 0.03 to 0.5% by mass of Si, preferably from 0.003 to 0.15% by mass;
h. 0.01% by mass or less of Cu; and
i. 0.01% by mass or less of Zn;
with the balance being Al;
each in relation to the total mass of the alloy composition, and wherein all compounds of the alloy add up to a total of 100% by mass; wherein the aluminum alloy comprises inevitable impurities, preferably wherein the inevitable impurities are present in an amount of less than 0.15% by mass, preferably in an amount of less than 0.1% by mass, further preferably in an amount of less than 0.05% by mass, and each individual impurity is present in an amount of less than 0.05% by mass, preferably in an amount of less than 0.01% by mass, further preferably in an amount of less than 0.001% by mass.

In an embodiment, the present disclosure relates to an aluminum alloy, comprising
a. from 10.2 to 11.8% by mass of Mg;
b. from 0.013 to 0.5% by mass of Ti;
c. from 0.001 to 0.1% by mass of Be;
d. 0.1% by mass or less of Mn;
e. 0.1% by mass or less of Fe;
f. from 0.0009 to 0.2% by mass of B;
g. 1% by mass or less of Si;
h. 0.01% by mass or less of Cu; and
i. 0.01% by mass or less of Zn;
with the balance being Al;
each in relation to the total mass of the alloy composition, and wherein all compounds of the alloy add up to a total of 100% by mass; wherein the aluminum alloy comprises inevitable impurities, preferably wherein the inevitable impurities are present in an amount of less than 0.15% by mass, preferably in an amount of less than 0.1% by mass, further preferably in an amount of less than 0.05% by mass, and each individual impurity is present in an amount of less than 0.05% by mass, preferably in an amount of less than 0.01% by mass, further preferably in an amount of less than 0.001% by mass.

In an embodiment, the present disclosure relates to an aluminum alloy, comprising
- a. from 10.2 to 11.8% by mass of Mg;
- b. from 0.013 to 0.5% by mass of Ti;
- c. from 0.001 to 0.1% by mass of Be;
- d. 0.1% by mass or less of Mn;
- e. 0.1% by mass or less of Fe;
- f. from 0.0009 to 0.2% by mass of B;
- g. 0.5% by mass or less of Si, preferably in an amount of 0.2% by mass or less;
- h. 0.01% by mass or less of Cu; and
- i. 0.01% by mass or less of Zn;
- with the balance being Al;
- each in relation to the total mass of the alloy composition, and wherein all compounds of the alloy add up to a total of 100% by mass; wherein the aluminum alloy comprises inevitable impurities, preferably wherein the inevitable impurities are present in an amount of less than 0.15% by mass, preferably in an amount of less than 0.1% by mass, further preferably in an amount of less than 0.05% by mass, and each individual impurity is present in an amount of less than 0.05% by mass, preferably in an amount of less than 0.01% by mass, further preferably in an amount of less than 0.001% by mass.

In an embodiment, the present disclosure relates to an aluminum alloy, comprising
- a. from 10.2 to 11.8% by mass of Mg;
- b. from 0.013 to 0.5% by mass of Ti;
- c. from 0.003 to 0.08% by mass of Be;
- d. from 0.0005 to 0.08% by mass of Mn;
- e. 0.1% by mass or less of Fe;
- f. from 0.0009 to 0.2% by mass of B;
- g. 0.5% by mass or less of Si, preferably in an amount of 0.2% by mass or less;
- h. 0.01% by mass or less of Cu; and
- i. 0.01% by mass or less of Zn;
- with the balance being Al;
- each in relation to the total mass of the alloy composition, and wherein all compounds of the alloy add up to a total of 100% by mass; wherein the aluminum alloy comprises inevitable impurities, preferably wherein the inevitable impurities are present in an amount of less than 0.15% by mass, preferably in an amount of less than 0.1% by mass, further preferably in an amount of less than 0.05% by mass, and each individual impurity is present in an amount of less than 0.05% by mass, preferably in an amount of less than 0.01% by mass, further preferably in an amount of less than 0.001% by mass.

In an embodiment, the present disclosure relates to an aluminum alloy, comprising
- a. from 10.2 to 11.8% by mass of Mg;
- b. from 0.013 to 0.5% by mass of Ti;
- c. from 0.003 to 0.08% by mass of Be;
- d. from 0.0005 to 0.08% by mass of Mn;
- e. from 0.001 to 0.1% by mass of Fe;
- f. from 0.0009 to 0.2% by mass of B;
- g. from 0.03 to 0.5% by mass of Si, preferably from 0.003 to 0.15% by mass;
- h. 0.01% by mass or less of Cu; and
- i. 0.01% by mass or less of Zn;
- with the balance being Al;
- each in relation to the total mass of the alloy composition, and wherein all compounds of the alloy add up to a total of 100% by mass; wherein the aluminum alloy comprises inevitable impurities, preferably wherein the inevitable impurities are present in an amount of less than 0.15% by mass, preferably in an amount of less than 0.1% by mass, further preferably in an amount of less than 0.05% by mass, and each individual impurity is present in an amount of less than 0.05% by mass, preferably in an amount of less than 0.01% by mass, further preferably in an amount of less than 0.001% by mass.

In an embodiment, the present disclosure relates to an aluminum alloy, comprising
- a. from 9.6 to 10.2% by mass of Mg;
- b. from 0.012 to 0.8% by mass of Ti;
- c. from 0.001 to 0.1% by mass of Be;
- d. 0.1% by mass or less of Mn;
- e. 0.1% by mass or less of Fe;
- f. from 0.0009 to 0.2% by mass of B;
- g. 1% by mass or less of Si;
- h. 0.01% by mass or less of Cu; and
- i. 0.01% by mass or less of Zn;
- with the balance being Al;
- each in relation to the total mass of the alloy composition, and wherein all compounds of the alloy add up to a total of 100% by mass; wherein the aluminum alloy comprises inevitable impurities, preferably wherein the inevitable impurities are present in an amount of less than 0.15% by mass, preferably in an amount of less than 0.1% by mass, further preferably in an amount of less than 0.05% by mass, and each individual impurity is present in an amount of less than 0.05% by mass, preferably in an amount of less than 0.01% by mass, further preferably in an amount of less than 0.001% by mass.

In an embodiment, the present disclosure relates to an aluminum alloy, comprising
- a. from 9.6 to 10.2% by mass of Mg;
- b. from 0.012 to 0.8% by mass of Ti;
- c. from 0.001 to 0.1% by mass of Be;
- d. 0.1% by mass or less of Mn;
- e. 0.1% by mass or less of Fe;
- f. from 0.0009 to 0.2% by mass of B;
- g. 0.5% by mass or less of Si, preferably in an amount of 0.2% by mass or less;
- h. 0.01% by mass or less of Cu; and
- i. 0.01% by mass or less of Zn;
- with the balance being Al;
- each in relation to the total mass of the alloy composition, and wherein all compounds of the alloy add up to a total of 100% by mass; wherein the aluminum alloy comprises inevitable impurities, preferably wherein the inevitable impurities are present in an amount of less than 0.15% by mass, preferably in an amount of less than 0.1% by mass, further preferably in an amount of less than 0.05% by mass, and each individual impurity is present in an amount of less than 0.05% by mass, preferably in an amount of less than 0.01% by mass, further preferably in an amount of less than 0.001% by mass.

In an embodiment, the present disclosure relates to an aluminum alloy, comprising
a. from 9.6 to 10.2% by mass of Mg;
b. from 0.012 to 0.8% by mass of Ti;
c. from 0.003 to 0.08% by mass of Be;
d. from 0.0005 to 0.08% by mass of Mn;
e. 0.1% by mass or less of Fe;
f. from 0.0009 to 0.2% by mass of B;
g. 0.5% by mass or less of Si, preferably in an amount of 0.2% by mass or less;
h. 0.01% by mass or less of Cu; and
i. 0.01% by mass or less of Zn;
with the balance being Al;
each in relation to the total mass of the alloy composition, and wherein all compounds of the alloy add up to a total of 100% by mass; wherein the aluminum alloy comprises inevitable impurities, preferably wherein the inevitable impurities are present in an amount of less than 0.15% by mass, preferably in an amount of less than 0.1% by mass, further preferably in an amount of less than 0.05% by mass, and each individual impurity is present in an amount of less than 0.05% by mass, preferably in an amount of less than 0.01% by mass, further preferably in an amount of less than 0.001% by mass.

In an embodiment, the present disclosure relates to an aluminum alloy, comprising
a. from 9.6 to 10.2% by mass of Mg;
b. from 0.012 to 0.8% by mass of Ti;
c. from 0.003 to 0.08% by mass of Be;
d. from 0.0005 to 0.08% by mass of Mn;
e. from 0.001 to 0.1% by mass of Fe;
f. from 0.0009 to 0.2% by mass of B;
g. from 0.03 to 0.5% by mass of Si, preferably from 0.003 to 0.15% by mass;
h. 0.01% by mass or less of Cu; and
i. 0.01% by mass or less of Zn;
with the balance being Al;
each in relation to the total mass of the alloy composition, and wherein all compounds of the alloy add up to a total of 100% by mass; wherein the aluminum alloy comprises inevitable impurities, preferably wherein the inevitable impurities are present in an amount of less than 0.15% by mass, preferably in an amount of less than 0.1% by mass, further preferably in an amount of less than 0.05% by mass, and each individual impurity is present in an amount of less than 0.05% by mass, preferably in an amount of less than 0.01% by mass, further preferably in an amount of less than 0.001% by mass.

In an embodiment, the present disclosure relates to an aluminum alloy, comprising
a. from 9.6 to 10.2% by mass of Mg;
b. from 0.013 to 0.5% by mass of Ti;
c. from 0.001 to 0.1% by mass of Be;
d. 0.1% by mass or less of Mn;
e. 0.1% by mass or less of Fe;
f. from 0.0009 to 0.2% by mass of B;
g. 1% by mass or less of Si;
h. 0.01% by mass or less of Cu; and
i. 0.01% by mass or less of Zn;
with the balance being Al;
each in relation to the total mass of the alloy composition, and wherein all compounds of the alloy add up to a total of 100% by mass; wherein the aluminum alloy comprises inevitable impurities, preferably wherein the inevitable impurities are present in an amount of less than 0.15% by mass, preferably in an amount of less than 0.1% by mass, further preferably in an amount of less than 0.05% by mass, and each individual impurity is present in an amount of less than 0.05% by mass, preferably in an amount of less than 0.01% by mass, further preferably in an amount of less than 0.001% by mass.

In an embodiment, the present disclosure relates to an aluminum alloy, comprising
a. from 9.6 to 10.2% by mass of Mg;
b. from 0.013 to 0.5% by mass of Ti;
c. from 0.001 to 0.1% by mass of Be;
d. 0.1% by mass or less of Mn;
e. 0.1% by mass or less of Fe;
f. from 0.0009 to 0.2% by mass of B;
g. 0.5% by mass or less of Si, preferably in an amount of 0.2% by mass or less;
h. 0.01% by mass or less of Cu; and
i. 0.01% by mass or less of Zn;
with the balance being Al;
each in relation to the total mass of the alloy composition, and wherein all compounds of the alloy add up to a total of 100% by mass; wherein the aluminum alloy comprises inevitable impurities, preferably wherein the inevitable impurities are present in an amount of less than 0.15% by mass, preferably in an amount of less than 0.1% by mass, further preferably in an amount of less than 0.05% by mass, and each individual impurity is present in an amount of less than 0.05% by mass, preferably in an amount of less than 0.01% by mass, further preferably in an amount of less than 0.001% by mass.

In an embodiment, the present disclosure relates to an aluminum alloy, comprising
a. from 9.6 to 10.2% by mass of Mg;
b. from 0.013 to 0.5% by mass of Ti;
c. from 0.003 to 0.08% by mass of Be;
d. from 0.0005 to 0.08% by mass of Mn;
e. 0.1% by mass or less of Fe;
f. from 0.0009 to 0.2% by mass of B;
g. 0.5% by mass or less of Si, preferably in an amount of 0.2% by mass or less;
h. 0.01% by mass or less of Cu; and
i. 0.01% by mass or less of Zn;
with the balance being Al;
each in relation to the total mass of the alloy composition, and wherein all compounds of the alloy add up to a total of 100% by mass; wherein the aluminum alloy comprises inevitable impurities, preferably wherein the inevitable impurities are present in an amount of less than 0.15% by mass, preferably in an amount of less than 0.1% by mass, further preferably in an amount of less than 0.05% by mass, and each individual impurity is present in an amount of less than 0.05% by mass, preferably in an amount of less than 0.01% by mass, further preferably in an amount of less than 0.001% by mass.

In an embodiment, the present disclosure relates to an aluminum alloy, comprising
a. from 9.6 to 10.2% by mass of Mg;
b. from 0.013 to 0.5% by mass of Ti;
c. from 0.003 to 0.08% by mass of Be;
d. from 0.0005 to 0.08% by mass of Mn;
e. from 0.001 to 0.1% by mass of Fe;
f. from 0.0009 to 0.2% by mass of B;
g. from 0.03 to 0.5% by mass of Si, preferably from 0.003 to 0.15% by mass;

h. 0.01% by mass or less of Cu; and
i. 0.01% by mass or less of Zn;
with the balance being Al;
each in relation to the total mass of the alloy composition, and wherein all compounds of the alloy add up to a total of 100% by mass; wherein the aluminum alloy comprises inevitable impurities, preferably wherein the inevitable impurities are present in an amount of less than 0.15% by mass, preferably in an amount of less than 0.1% by mass, further preferably in an amount of less than 0.05% by mass, and each individual impurity is present in an amount of less than 0.05% by mass, preferably in an amount of less than 0.01% by mass, further preferably in an amount of less than 0.001% by mass.

The above outlined aluminum alloy of the first aspect may be used, in all its embodiments and—were reasonable—combination of embodiments, in the following aspects of the present disclosure.

A second aspect of the present disclosure relates to a method for the preparation of an aluminum alloy according to the first aspect as disclosed above, comprising the steps of
a. Providing a raw aluminum;
b. Heating the raw aluminum to a temperature in the range of from 650 to 800° C., preferably from 700 to 770° C.;
c. Adding Mg and Be to result in a raw alloy;
d. Optionally degassing the raw alloy;
e. Adding Ti and B to the optionally degassed raw alloy to prepare the aluminum alloy.

The raw aluminum is preferably provided having a low amount of impurities, preferably having a level of impurity of 0.3% by mass or below. The raw aluminum is then heated in a furnace to a temperature melting the aluminum, but not heating the aluminum too high, in particular not above 900° C., in order to avoid the formation of excess oxidation products. It is therefore preferred to heat the raw aluminum to a temperature in the range of from 650 to 800° C., preferably from 700 to 770° C., further preferably from 720 to 750° C. Prior to the addition of the raw aluminum to the furnace, the furnace may be pre-heated, preferably to a temperature in the range of from 400 to 900° C.

Once the raw aluminum is melted, Mg and Be are added. As these metals are added in solid form, the temperature of the melt will drop. It is therefore preferred to re-heat the aluminum melt to a previously defined temperature or temperature range, or to maintain the previously defined temperature or temperature range during addition of the metals. Further optional elements, such as Mn, Fe, Cu, Zn or Si, may be added during this step.

The resulting raw aluminum alloy may then optionally be degassed using usual measures. In a preferred embodiment, the degassing may be supported by argon gas as purging gas.

After the addition of the above listed elements, and the optional degassing step, Ti and optionally B are added in a final step. The final aluminum alloy melt may then be cast, e.g., to blocks for further or later processing, such as in the method of the third aspect, or it may be directly used starting from step b. of the method of the third aspect.

In a third aspect, the present disclosure relates to a method for the additive manufacture (AM) of a workpiece comprising the steps of
f. Setting a layer of aluminum powder comprising an aluminum alloy according to the first aspect, preferably in vacuo or an inert gas atmosphere;
g. Selectively melting the powder by using at least one laser beam;
h. Iterating steps f. and g. until the workpiece is finished;
i. Optionally treating the workpiece by blasting, machining, heat and/or other treatments.

In a preferred embodiment, aluminum alloy metal powder, comprising or consisting of the aluminum alloy as disclosed herein above in relation to the first aspect, is used in the additive manufacturing process. The inert gas atmosphere may be, e.g., an atmosphere of nitrogen gas, argon gas, helium gas, or a mixture thereof.

The metal powder may be prepared in any know method, such as in a metal removal process (e.g., metal cutting or machining the metal) or a powder metallurgy (PM) process. A PM process is preferred for the use of the present disclosure as such PM process usually have higher yields, and thus lower costs.

Exemplarily, the aluminum alloy produced as described above may be transferred into powder form by a method, comprising the steps of
a. Providing an aluminum alloy according to the first aspect;
b. Heating the aluminum alloy to a temperature in the range of from 650 to 800° C., thereby melting the aluminum alloy;
c. Affecting each fluid drop of the alloy i.e. by a gas with the effect that the fluid alloy drop gets atomized;
d. Cooling down the aluminum alloy powder;
e. Optionally selecting relevant powder corn sizes (e.g. between 20 and 65 µm).

Figure 4:
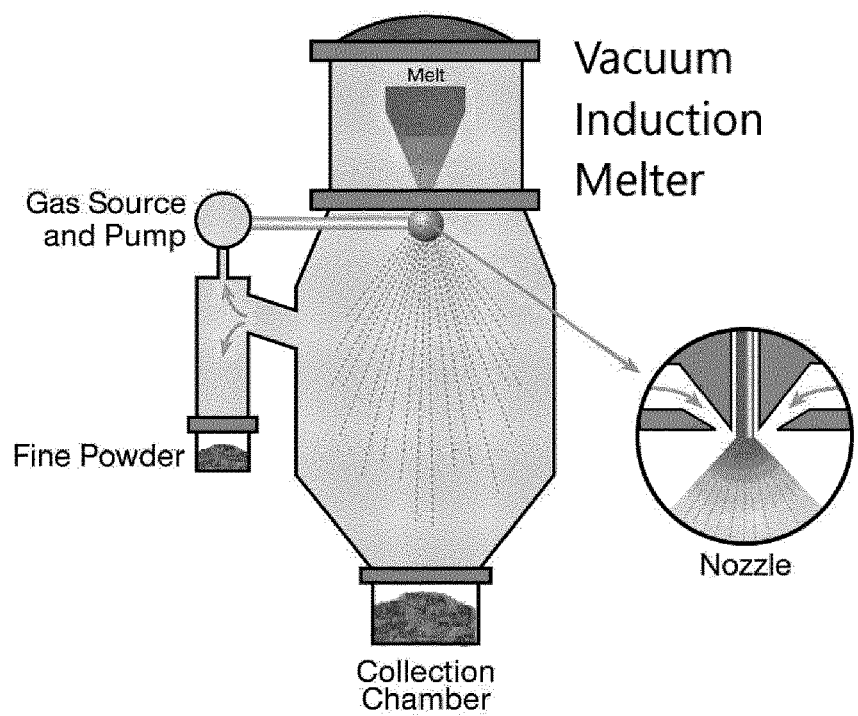
FIG. 4 Schematic representation of an exemplary method for the preparation of metal powders using a de laval nozzle.

A preferred process for the preparation of aluminum alloy metal powders as used according to the present disclosure is atomization. Atomization is accomplished by forcing a molten metal stream through an orifice (e.g., de laval nozzle) at moderate pressures (see also FIG. 4). The molten metal may be re-molten alloy, or an alloy prepared in situ. A gas, preferably an inert gas, is introduced into the metal stream just before it leaves the nozzle, serving to create turbulence as the entrained gas expands (due to heating) and exits into a large collection volume exterior to the orifice. The collection volume is filled with gas to promote further turbulence of the molten metal jet. Air and powder streams are segregated using gravity or cyclonic separation. The resulting powders may be separated according to their particle size.

Another preferred process or the preparation of aluminum alloy metal powders as used according to the present disclosure is centrifugal disintegration. The aluminum alloy to be powdered is formed into a rod which is introduced into a chamber through a rapidly rotating spindle. Opposite the spindle tip is an electrode from which an arc is established which heats the metal rod. As the tip material fuses, the rapid rod rotation throws off tiny melt droplets which solidify before hitting the chamber walls. A circulating gas, preferably an inert gas, sweeps particles from the chamber.

The aluminum alloy of the present disclosure may be used in any known method of additive manufacturing. For the purposes of the present application, additive manufacturing in particular refers to laser additive manufacturing by laser sintering techniques. Laser sintering techniques include selective laser sintering (SLS), selective laser melting (SLM), direct metal laser sintering, and laser metal deposition (LMD).

Selective laser melting does not use sintering for the fusion of powder granules but will completely melt the powder using a high-energy laser to create fully dense materials in a layer-wise method that has mechanical properties similar to those of conventional manufactured metals. What sets SLS apart from other 3D printing processes is the lacked ability to fully melt the powder, rather heating it up to a specific point where the metal powder grains can fuse together, allowing for the porosity of the material to be controlled. On the other hand, SLM can go one step further than SLS, by using the laser to fully melt the metal, meaning the powder is not being fused together but actually liquefied long enough to melt the powder grains into a homogeneous part. Therefore, SLM can produce stronger parts because of reduced porosity and greater control over crystal structure, which helps prevent part failure.

Electron beam melting (EBM) is a similar type of additive manufacturing technology for metal parts. EBM manufactures parts by melting metal powder layer by layer with an electron beam in a high vacuum.

Laser metal deposition is a method of depositing material by which a powdered or wire feedstock metal material is melted and consolidated by use of a laser in order to coat part of a substrate or fabricate a near-net shape part. The powder used in laser metal deposition is injected into the system by either coaxial or lateral nozzles. The interaction of the metallic powder stream and the laser causes melting to occur, and is known as the melt pool. This is deposited onto a substrate; moving the substrate allows the melt pool to solidify and thus produces a track of solid metal. This is the most common technique, however some processes involve moving the laser/nozzle assembly over a stationary substrate to produce solidified tracks. The motion of the substrate is usually guided by a CAD system which interpolates solid objects into a set of tracks, thus producing the desired part at the end of the trajectory.

In another preferred embodiment of the third aspect, the aluminum alloy product is heat treated after step e. by heating the workpiece to a temperature of at least 380° C., or at least 400° C., or at least 430° C., or at least 450° C., for a period of less than 1 hour, or less than 3 hours, or less than 5 hours, or less than 8 hours, or less than 12 hours, or less than 18 hours, or less than 24 hours, preferably less than 12 hours, or preferably less than 18 hours, or for a period of at least 10 minutes, or at least 1 hour, or at least 3 hours, or at least 8 hours, or at least 12 hours, or at least 24 hours, and then cooled in air at ambient temperature (e.g., a temperature in the range of 20 to 25° C.). Said heat treating step may optionally be applied in addition to a forming step, prior to or after said forming step. Alternatively, if a forming step is not desired, only a heat treatment may be (optionally) applied to the workpiece. Without being bound by any theory, it is assumed that during said heat treatment, a phase transition takes place in the aluminum alloy, increasing the tensile strength, the yield strength, and/or the elongation of the workpiece.

In a further preferred embodiment of the second aspect and/or the third aspect, the aluminum alloy is characterized by low or no formation of dross (i.e. aluminum dross). Aluminum dross may occur upon exposition of molten aluminum alloy to air. A longer exposition to air promotes an enhanced formation of dross. In a preferred embodiment of the second aspect and/or the third aspect, molten aluminum alloy is characterized by low or no formation of dross over a long-term exposition to air (e.g., 8 hours). The formation of dross may be visible to the bare eye and/or detectable by any technical method applicable thereto (e.g., spectral analysis).

A fourth aspect of the present disclosure relates to the use of an aluminum alloy of the first aspect in an additive manufacturing process.

In a preferred embodiment of the fourth aspect, the additive manufacturing process is selected from the group consisting of selective laser sintering (SLS), selective laser melting (SLM), direct metal laser sintering, and laser metal deposition (LMD).

In a further preferred embodiment, the additive manufacturing process is selective laser sintering or selective laser melting.

A fifth aspect of the present disclosure relates to an aluminum alloy product comprising or consisting of an aluminum alloy according to the first aspect, and/or being prepared by a method according to the third aspect, wherein
i) at least parts of the product have a thickness in the range of from 1 to 23 mm, or 3 to 15 mm, or from 6 to 12 mm, or from 6 to 9 mm; or 1 to 10 mm, or 3 to 10 mm; and/or
ii) the aluminum of the product has a tensile strength of at least 290 MPa, or at least 320 MPa, or at least 360 MPa, or at least 370 MPa, or at least 380 MPa; and/or
iii) the aluminum of the product has a yield strength of at least 170 MPa, or at least 180 MPa, or at least 200 MPa, or at least 215 MPa; and/or
iv) the aluminum of the product has elongation of at least 5%, or at least 15%, or at least 20%, or at least 30%, or at least 34%.

According to a preferred embodiment of the fifth aspect,
i) the aluminum of the product has a tensile strength, measured at a thickness of from 1 to 23 mm, or 3 to 15 mm, or from 6 to 12 mm, or from 6 to 9 mm; or 1 to 10 mm, or 3 to 10 mm, of at least 290 MPa, or at least 320 MPa, or at least 360 MPa, or at least 370 MPa, or at least 380 MPa; and/or
ii) the aluminum of the product has a yield strength, measured at a thickness of from 1 to 23 mm, or 3 to 15 mm, or from 6 to 12 mm, or from 6 to 9 mm; or 1 to 10 mm, or 3 to 10 mm, of at least 170 MPa, or at least 180 MPa, or at least 200 MPa, or at least 215 MPa; and/or
iii) the aluminum of the product has elongation, measured at a thickness of from 1 to 23 mm, or 3 to 15 mm, or from 6 to 12 mm, or from 6 to 9 mm; or 1 to 10 mm, or 3 to 10 mm, of at least 5%, or at least 15%, or at least 20%, or at least 30%, or at least 34%.

According to another preferred embodiment of the fifth aspect,
i) at least parts of the product have a thickness in the range of from 1 to 10 mm, or 3 to 10 mm, or from 6 to 9 mm; and/or
ii) the aluminum of the product has a tensile strength of at least 380 MPa, or at least 400 MPa, or at least 420 MPa; and/or
iii) the aluminum of the product has a yield strength of at least 200 MPa, or at least 215 MPa; and/or
iv) the aluminum of the product has elongation of at least 20%, or at least 24%.

According to another preferred embodiment of the fifth aspect,
i) the aluminum of the product has a tensile strength, measured at a thickness of from 1 to 10 mm, or 3 to 10 mm, or from 6 to 9 mm, of at least 380 MPa, or at least 400 MPa, or at least 420 MPa; and/or
ii) the aluminum of the product has a yield strength, measured at a thickness of from 1 to 10 mm, or 3 to 10 mm, or from 6 to 9 mm, of at least 200 MPa, or at least 215 MPa; and/or
iii) the aluminum of the product has elongation, measured at a thickness of from 1 to 10 mm, or 3 to 10 mm, or from 6 to 9 mm, of at least 20%, or at least 24%.

According to another preferred embodiment of the fifth aspect, i) at least parts of the product have a thickness in the range of from 1 to 23 mm, or 3 to 15 mm, or from 6 to 12 mm, or from 6 to 9 mm; and/or
ii) the aluminum of the product has a tensile strength of at least 290 MPa, or at least 320 MPa, or at least 360 MPa, or at least 370 MPa, or at least 380 MPa; and/or
iii) the aluminum of the product has a yield strength of at least 170 MPa, or at least 180 MPa; and/or
iv) the aluminum of the product has elongation of at least 5%, or at least 15%, or at least 20%, or at least 30%, or at least 34%.

According to another preferred embodiment of the fifth aspect,
i) the aluminum of the product has a tensile strength, measured at a thickness of from 1 to 23 mm, or 3 to 15 mm, or from 6 to 12 mm, or from 6 to 9 mm, of at least 290 MPa, or at least 320 MPa, or at least 360 MPa, or at least 370 MPa, or at least 380 MPa; and/or
ii) the aluminum of the product has a yield strength, measured at a thickness of from 1 to 23 mm, or 3 to 15 mm, or from 6 to 12 mm, or from 6 to 9 mm, of at least 170 MPa, or at least 180 MPa; and/or
iii) the aluminum of the product has elongation, measured at a thickness of from 1 to 23 mm, or 3 to 15 mm, or from 6 to 12 mm, or from 6 to 9 mm, of at least 15%, or at least 20%, or at least 30%, or at least 34%.

A sixth aspect of the present disclosure relates to an aluminum alloy product prepared, obtained or obtainable by a method according to the third aspect.

As will also be obvious from the Examples below, the aluminum alloy of the present disclosure has a high tensile strength, a high yield strength, and a high elongation, in particular at a thickness in the range of from 1 to 23 mm.

Definition of Terms

The present invention as illustratively described in the following may suitably be practiced in the absence of any element or elements, limitation or limitations, not specifically disclosed herein.

The present invention will be described with respect to particular embodiments and with reference to certain figures but the invention is not limited thereto but only by the claims. Terms as set forth hereinafter are generally to be understood in their common sense unless indicated otherwise.

Where the term "comprising" is used in the present description and claims, it does not exclude other elements. For the purposes of the present invention, the term "consisting of" is considered to be a preferred embodiment of the term "comprising". If hereinafter a group is defined to comprise at least a certain number of embodiments, this is also to be understood to disclose a group, which preferably consists only of these embodiments. Furthermore, if a composition is defined using the term "comprising", it may additionally comprise other elements not explicitly listed, however, not further amounts of an element listed. As such, if, e.g., an aluminum alloy comprises Mg in an amount of 14% by mass, said aluminum alloy may comprise elements other than Mg, however, not additional amounts of Mg, thereby exceeding the amount of 14% by mass.

Where an indefinite or definite article is used when referring to a singular noun, e.g. "a", "an" or "the", this includes a plural of that noun unless something else is specifically stated.

Terms like "obtainable" or "definable" and "obtained" or "defined" are used interchangeably. This e.g. means that, unless the context clearly dictates otherwise, the term "obtained" does not mean to indicate that e.g. an embodiment must be obtained by e.g. the sequence of steps following the term "obtained" even though such a limited understanding is always included by the terms "obtained" or "defined" as a preferred embodiment.

As used herein, the terms "impurity" and "impurities" refer to and comprises elements in the alloy which are inevitably present due to, e.g., the manufacturing process of the alloy or the manufacturing process of the raw material (s). An impurity is not explicitly mentioned in the list of elements in the alloy, however, an element may turn from an impurity to an essential element in the alloy. If, e.g., an element is not mentioned in a more general definition of the composition of an alloy, it may be present as an impurity, and the same element may be mentioned as a compulsory compound in a more specific definition of the composition of the alloy.

The aluminum alloy of the present disclosure is composed of different components. These components are explicitly listed in the composition of the alloy, or they are part of the impurities present in the alloy. In any case, if a component is defined as an amount in % by mass, the figure reflects the relative amount (as mass) in percent based on the total mass of the alloy composition.

In some embodiments, "at least parts" of a product or workpiece have a thickness in a defined range. In this context, "at least parts" refers to at least 1%, or at least 3%, or at least 5%, or at least 10% of the entire surface of the product or workpiece. The thickness of the product or workpiece may be determined at each point of the surface of the product or workpiece by measuring the shortest distance across the product or workpiece. By integration over the entire surface, the "part" of the product or workpiece having a thickness in the defined range may be calculated.

EXAMPLES

Example 1: Preparation of Aluminum Alloys

All aluminum alloys were prepared in an electrical induction furnace (Inductotherm, model V.I.P. Power Trak 150), which was preheated to a temperature of about 300° C. over a period of about 15 minutes. After the furnace has reached a temperature of about 300° C., 60 kg of raw aluminum (with 0.3% by mass or less of total impurities; from MTX Aluminium Werke GmbH, Lend, Austria).

The raw aluminum was heated to 720 to 750° C. and the respective amounts of Mg (from DEUMU Deutsche Erz- and Metall-Union GmbH, Germany, pure magnesium, at least 99.9%) and Be (added as pellets of AlBe, containing 5% by mass of Be, the remainder being Al, from Hoesch Metals, Niederzier, Germany) were added. After re-heating to 720 to 750° C., the melt was de-gassed for 10 minutes with Argon gas as purging gas using an injection lance.

Then, at a temperature in the range of 650 to 750° C., Ti and B are added as bars containing Ti and B in a ratio of 5:1 (added as pellets of AlTi5B1, containing 5% by mass of Ti, 1% by mass of B, the remainder being Al, from Foseco-Vesuvius, Germany). The pellets are stirred into the liquid alloy, and immediately after mixing, the crucible is removed from the furnace and the liquid alloy is cast into a respective mold.

Without being bound to any theory, it is assumed that some of the boron is removed by removing the foam from the top of the melt since boron has a low specific density, in particular in relation to titanium, explaining the ratio of about 10:1 of Ti:B in the final alloy. The remaining elements are present in the alloy as impurities from the starting materials.

TABLE 1

| No. | Mg | Ti | B | Si | Be | Mn | Cu | Zn | Fe |
|-----|------|-------|--------|-------|-------|---------|----------|--------|-------|
| 1 | 9.98 | 0.016 | 0.001 | 0.057 | 0.005 | 0.001 | 0.001 | 0.005 | 0.035 |
| 2 | 10.44 | 0.319 | 0.032 | 0.058 | 0.015 | 0.001 | 0.001 | 0.005 | 0.069 |
| 3 | 10.91 | 0.303 | 0.0046 | 0.050 | 0.015 | 0.00088 | <0.00002 | 0.0027 | 0.032 |

All amounts are given in % by mass. The balance to the compositions disclosed in Table 1 is aluminum.

Example 2: Heat Treatment

The mechanical properties of alloy No. 1 of Example 1 were investigated with respect to the type of casting and an optional heat treatment.

Cylindrical samples having a diameter of 14 mm were cast from alloy No. 1 of Example 1 in a sand mold. The samples were subjected to tests determining the tensile strength ($R_m$), the yield strength ($R_{p0.2}$) and the elongation (A). The measuring length was 84 mm for the sand mold casting.

Identical samples as prepared above were subjected to a heat treatment after the preparation of the respective castings for homogenization. The castings were heated at a temperature of 430° C. and maintained at that temperature for 9 hours. After said heat treatment, the samples were cooled in air at ambient temperature.

The heat treated samples were also tested for the tensile strength, yield strength and elongation in the same manner as the untreated samples (see above). All test results are summarized in Table 2 below.

TABLE 2

| Property | Sand mold casting | |
|----------|------|------|
| $R_m$ [MPa] | 178 | 320 |
| $R_{p0.2}$ [MPa] | 160 | 172 |
| A [%] | 0.5 | 12.0 |
| Heat treatment | —/— | 430° C./9 h/air |

It can be seen from the above test results that the sand mold casting, despite having lower tensile strength, yield strength and elongation in the untreated state compared to the permanent mold casting, both castings are very similar in their mechanical properties after the heat treatment. Microstructural investigation of the sample revealed that the homogenization did not affect the Mg concentration within the grains, i.e., there was no balancing of Mg concentration within the grains. The Mg content was still lower at the core of the grain, compared to the grain boundary. This can be seen from the EDX analysis of the sample after homogenization. FIG. 1 shows a cross section of the sample after homogenization.

The sample was cut, and the resulting cutting area was several times precision ground and then polished. The final cutting area was investigated in an electron microscope, resulting in the REM picture of FIG. 1. The magnification is 250 times, the working distance between optical lens and surface of the final cutting area was 10 mm, the emission current was 75 μA, and the beam current was 3.5 nA.

An EDX analysis was made along the line as indicated in FIG. 1. The respective intensities for the metals aluminum (a), magnesium (b), iron (c) and copper (d) are shown in the corresponding FIG. 2. All x-ray measurements were made in accordance with DIN EN ISO 17636-1:2013-05, setting the parameters for magnesium and then adapting for aluminum, as there are no parameters for aluminum in the specification. The assessment of the x-ray films was then made in accordance with ASTM E2422-17 and ASTM E2869-17.

These results were confirmed by a DSC analysis of a further sample as shown in Example 3 below.

Example 3: DSC Analysis

The transformation of the sample during heat treatment was further investigated using DSC.

A bar of 18 mm thickness was cast using alloy No. 1 of Example 1. Said bar was not heat treated.

The sample was analyzed using heat-flux DSC. Two identical crucibles were put into a furnace and were subjected to the same time-temperature profile. One of the crucibles was provided with the sample ("sample crucible"), the other was left empty ("reference crucible"). The furnace was then heated at a rate of 2° C./min. The temperature range for the analysis was set in the range of 50° C. to 525° C. Thermal processes in a sample result in a temperature difference (ΔT) between the temperature of the sample crucible ($T_{sample}$) and the temperature of the reference crucible ($T_{reference}$):

$$\Delta T = T_{sample} - T_{reference}$$

Figure 3:
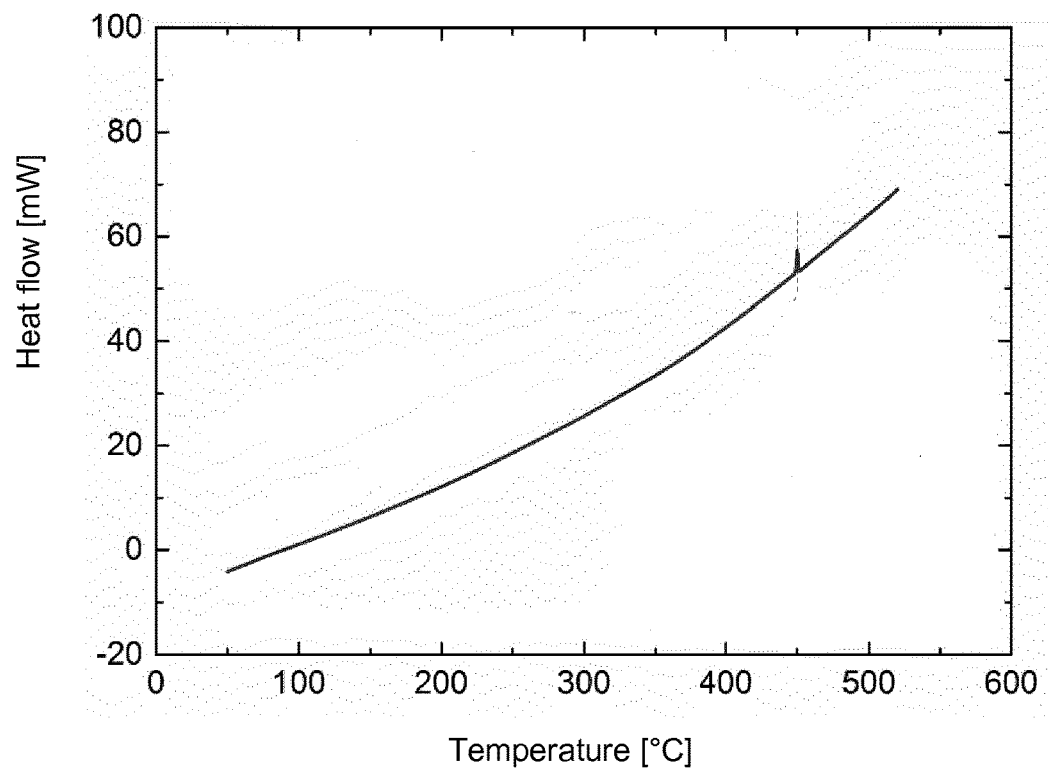
FIG. 3: DSC analysis showing the heat flow of a sample according to Example 3.

The temperature curve showed a steady increase of the temperature until 450° C. The curve then has a steep increase, and after reaching the maximum, the curve as a steep decrease again (see FIG. 3). A repetition of the measurement with the same sample did not show the increase in temperature any more. Said increase in temperature is an indication for an exothermal process taking place in the sample at about 450° C.

Example 4: Properties of Aluminum Alloys

Plates with the thickness specified in Table 3 below were prepared using sandcasting method. These plates were subjected to different tests as specified below in Table 3 resulting in the tensile strength ($R_m$), the yield strength ($R_{p0.2}$) and the elongation (A).

Example 5: Heat Treatment

According to a the method as described in Example 2, the mechanical properties of alloy No. 3 of Example 1 were further investigated with respect to an optional heat treatment. In contrast to Example 2, the samples were prepared by permanent mold casting and the heat treatment was performed at 450° C. for 24 hours.

The determined tensile strength, yield strength and elongation of the samples are summarized in Table 4 below.

TABLE 4

| Property | Permanent mold casting | |
|---|---|---|
| R$_m$ [MPa] | 216 | 400 |
| R$_{p0.2}$ [MPa] | 167 | 202 |
| A [%] | 0.7 | 25.1 |
| Heat treatment | —/— | 450° C./24 h/air |

TABLE 3

| | | Thickness [mm] | | | | | | |
|---|---|---|---|---|---|---|---|---|
| No. | Property | 6 | 9 | 12 | 15 | 18 | 21 | 30 |
| 1 | tensile strength [MPa] | 382 | 380 | 378 | 373 | 362 | 327 | 277 |
| | yield strength [MPa] | 178 | 179 | 192 | 177 | 177 | 174 | 162 |
| | elongation [%] | 34.7 | 36.9 | 35.1 | 34.0 | 23.0 | 15.20 | 9.6 |
| 2 | tensile strength [MPa] | 429 | 427 | 341 | 330 | 330 | 296 | 280 |
| | yield strength [MPa] | 220 | 219 | 220 | 200 | 206 | 207 | 189 |
| | elongation [%] | 25.7 | 24.5 | 7.4 | 8.7 | 8.6 | 5.0 | 5.6 |

The samples were prepared and tested in accordance with DIN 50125:2009 and DIN EN ISO 6892-1:2009 at room temperature (23° C.).

The present disclosure also pertains to the following numbered items:

1. An aluminum alloy comprising
   a. from 9 to 14% by mass of magnesium (Mg);
   b. from 0.011 to 1% by mass of titanium (Ti);
   c. 0.1% by mass or less of manganese (Mn); and
   d. 0.1% by mass or less of iron (Fe);
   e. from 0.001 to 0.1% by mass of beryllium (Be);
   with the balance being aluminum (Al);
   each in relation to the total mass of the alloy composition, and wherein all compounds of the alloy add up to a total of 100% by mass.
2. The aluminum alloy according to item 1, wherein the aluminum alloy comprises
   a. from 9 to 14% by mass of magnesium (Mg);
   b. from 0.011 to 1% by mass of titanium (Ti);
   c. 0.1% by mass or less of manganese (Mn);
   d. 0.1% by mass or less of iron (Fe);
   e. from 0.001 to 0.1% by mass of beryllium (Be);
   f. from 0.0009 to 0.2% by mass of boron (B); and
   g. 1% by mass or less of silicon (Si);
   with the balance being aluminum (Al);
   each in relation to the total mass of the alloy composition, and wherein all compounds of the alloy add up to a total of 100% by mass.
3. The aluminum alloy according to items 1 or 2, wherein the aluminum alloy further comprises 0.01% by mass or less of copper (Cu) and 0.01% by mass or less of zinc (Zn).
4. The aluminum alloy according to any one of items 1 to 3, wherein the aluminum alloy comprises inevitable impurities, preferably wherein the inevitable impurities are present in an amount of less than 0.15% by mass, preferably in an amount of less than 0.1% by mass, further preferably in an amount of less than 0.05% by mass, and each individual impurity is present in an amount of less than 0.05% by mass, preferably in an amount of less than 0.01% by mass, further preferably in an amount of less than 0.001% by mass.
5. The aluminum alloy according to any one of items 1 to 4, wherein Mg is present in an amount of from 9.1 to 13.9% by mass, preferably in an amount of from 9.2 to 13% by mass, preferably in an amount of from 9.5 to 12% by mass, preferably in an amount of from 10.2 to 11.8% by mass, or in an amount of from 9.2 to 10.2% by mass, or in an amount of from 9.6 to 10.2% by mass.
6. The aluminum alloy according to any one of items 1 to 5, wherein Mg is present preferably in an amount of from 9.8 to 11% by mass, or preferably in an amount of from 10.2% to 13% by mass.
7. The aluminum alloy according to any one of items 1 to 6, wherein Ti is present
   i) in an amount of from 0.011 to 0.9% by mass, preferably in an amount of from 0.012 to 0.8% by mass, preferably in an amount of from 0.013 to 0.5% by mass, or in an amount of 0.011% by mass or more; and/or
   ii) in an amount of 0.015% by mass or more, or in an amount of 0.15% by mass or more, or in an amount of 0.2% by mass or more, or in an amount of 0.3% by mass or more; and/or
   iii) in an amount of 0.9% by mass or less, or in an amount of 0.8% by mass or less, or in an amount of 0.7% by mass or less, or in an amount of 0.6% by mass or less, or in an amount of 0.4% by mass or less.
8. The aluminum alloy according to any one of items 1 to 7, wherein Mn is present
   i) in an amount of 0.09% by mass or less, preferably in an amount of 0.08% by mass or less, preferably in an amount of 0.04% by mass or less, preferably in an amount of 0.005% by mass or less; and/or
   ii) in an amount of 0.0001% by mass or more, preferably in an amount of 0.0005% by mass or more.
9. The aluminum alloy according to any one of items 1 to 8, wherein Fe is present
   i) in an amount of 0.09% by mass or less, preferably in an amount of 0.08% by mass or less, preferably in an amount of 0.05% by mass or less, preferably in an amount of 0.03% by mass or less; and/or
   ii) in an amount of 0.01% by mass or more, preferably in an amount of 0.05% by mass or more.
10. The aluminum alloy according to any one of items 1 to 9, wherein Be is present
    i) in an amount of from 0.002 to 0.09% by mass, preferably in an amount of from 0.003 to 0.08% by mass, preferably in an amount of from 0.007 to 0.06% by mass; and/or
    ii) in an amount of 0.002% by mass or more, or in an amount of 0.003% by mass or more, or in an amount of 0.004% by mass or more; and/or
    iii) in an amount of 0.09% by mass or less, or in an amount of 0.08% by mass or less, or in an amount of 0.07% by mass or less, or in an amount of 0.06% by mass or less, or in an amount of 0.04% by mass or less.
11. The aluminum alloy according to any one of items 1 to 10, wherein Be is present in an amount of from 0.005% by mass or more, or in an amount of 0.015% by mass or more.
12. The aluminum alloy according to any one of items 1 to 11, wherein boron (B) is present
    i) in an amount of from 0.0009 to 0.2% by mass, preferably in an amount of from 0.001 to 0.15% by mass, preferably in an amount of from 0.006 to 0.1% by mass, preferably in an amount of from 0.01 to 0.1% by mass, preferably in an amount of from 0.015 to 0.05% by mass; and/or
    ii) in an amount of 0.0009% by mass or more, or in an amount of 0.001% by mass or more, or in an amount of 0.006% by mass or more; and/or
    iii) in an amount of 0.1% by mass or less, or in an amount of 0.08% by mass or less, or in an amount of 0.07% by mass or less, or in an amount of 0.06% by mass or less, or in an amount of 0.04% by mass or less.
13. The aluminum alloy according to any one of items 1 to 12, wherein boron (B) is present in an amount of 0.03% by mass or more.
14. The aluminum alloy according to any one of items 1 to 13, wherein silicon (Si) is present
    i) in an amount of 1% by mass or less, preferably in an amount of 0.5% by mass or less, preferably in an amount of 0.3% by mass or less, preferably in an amount of 0.2% by mass or less, preferably in an amount of 0.15% by mass or less, preferably in an amount of 0.1% by mass or less; and/or
    ii) in an amount of 0.01% by mass or more, preferably in an amount of 0.03% by mass or more, preferably in an amount of 0.05% by mass or more, preferably in an amount of 0.07% by mass or more.
15. The aluminum alloy according to any one of items 1 to 14, wherein copper (Cu) is present
    i) in an amount of 0.01% by mass or less, preferably in an amount of 0.005% by mass or less, preferably in an amount of 0.003% by mass or less; and/or
    ii) in an amount of 0.0001% by mass or more, preferably in an amount of 0.0005% by mass or more.
16. The aluminum alloy according to any one of items 1 to 15, wherein zinc (Zn) is present
    i) in an amount of 0.01% by mass or less, preferably in an amount of 0.008% by mass or less, preferably in an amount of 0.007% by mass or less; and/or
    ii) in an amount of 0.001% by mass or more, preferably in an amount of 0.003% by mass or more.
17. The aluminum alloy according to any one of items 1 to 16, comprising
    a. from 9 to 14% by mass of Mg;
    b. from 0.011 to 1% by mass of Ti;
    c. from 0.001 to 0.1% by mass of Be;
    d. 0.1% by mass or less of Mn;
    e. 0.1% by mass or less of Fe;
    f. from 0.0009 to 0.2% by mass of B;
    g. 1% by mass or less of Si;
    h. 0.01% by mass or less of Cu; and
    i. 0.01% by mass or less of Zn;
    with the balance being Al;
    each in relation to the total mass of the alloy composition, and wherein all compounds of the alloy add up to a total of 100% by mass; wherein the aluminum alloy comprises inevitable impurities, preferably wherein the inevitable impurities are present in an amount of less than 0.15% by mass, preferably in an amount of less than 0.1% by mass, further preferably in an amount of less than 0.05% by mass, and each individual impurity is present in an amount of less than 0.05% by mass, preferably in an amount of less than 0.01% by mass, further preferably in an amount of less than 0.001% by mass.
18. The aluminum alloy according to any one of items 1 to 16, comprising
    a. from 9.5 to 12% by mass of Mg;
    b. from 0.012 to 0.8% by mass of Ti;
    c. from 0.001 to 0.1% by mass of Be;
    d. 0.1% by mass or less of Mn;
    e. 0.1% by mass or less of Fe;
    f. from 0.0009 to 0.2% by mass of B;
    g. 1% by mass or less of Si;
    h. 0.01% by mass or less of Cu; and
    i. 0.01% by mass or less of Zn;
    with the balance being Al;
    each in relation to the total mass of the alloy composition, and wherein all compounds of the alloy add up to a total of 100% by mass; wherein the aluminum alloy comprises inevitable impurities, preferably wherein the inevitable impurities are present in an amount of less than 0.15% by mass, preferably in an amount of less than 0.1% by mass, further preferably in an amount of less than 0.05% by mass, and each individual impurity is present in an amount of less than 0.05% by mass, preferably in an amount of less than 0.01% by mass, further preferably in an amount of less than 0.001% by mass.
19. The aluminum alloy according to any one of items 1 to 16, comprising
    a. from 9.5 to 12% by mass of Mg;
    b. from 0.012 to 0.8% by mass of Ti;
    c. from 0.001 to 0.1% by mass of Be;
    d. 0.1% by mass or less of Mn;
    e. 0.1% by mass or less of Fe;
    f. from 0.0009 to 0.2% by mass of B;
    g. 0.5% by mass or less of Si, preferably in an amount of 0.3% by mass or less;
    h. 0.01% by mass or less of Cu; and
    i. 0.01% by mass or less of Zn;
    with the balance being Al;
    each in relation to the total mass of the alloy composition, and wherein all compounds of the alloy add up to a total of 100% by mass; wherein the aluminum alloy comprises inevitable impurities, preferably wherein the inevitable impurities are present in an amount of less than 0.15% by mass, preferably in an amount of less than 0.1% by mass, further preferably in an amount of less than 0.05% by mass, and each individual impurity is present in an amount of less than 0.05% by mass, preferably in an amount of less than 0.01% by mass, further preferably in an amount of less than 0.001% by mass.
20. The aluminum alloy according to any one of items 1 to 16, comprising
    a. from 9.5 to 12% by mass of Mg;
    b. from 0.012 to 0.8% by mass of Ti;
    c. from 0.003 to 0.08% by mass of Be;
    d. from 0.0005 to 0.08% by mass of Mn;
    e. 0.1% by mass or less of Fe;
    f. from 0.0009 to 0.2% by mass of B;
    g. 0.5% by mass or less of Si, preferably in an amount of 0.3% by mass or less;
    h. 0.01% by mass or less of Cu; and
    i. 0.01% by mass or less of Zn;
    with the balance being Al;
    each in relation to the total mass of the alloy composition, and wherein all compounds of the alloy add up to a total of 100% by mass; wherein the aluminum alloy comprises inevitable impurities, preferably wherein the inevitable impurities are present in an amount of less than 0.15% by mass, preferably in an amount of less than 0.1% by mass, further preferably in an amount of less than 0.05% by mass, and each individual impurity is present in an amount of less than 0.05% by mass, preferably in an amount of less than 0.01% by mass, further preferably in an amount of less than 0.001% by mass.

21. The aluminum alloy according to any one of items 1 to 16, comprising
   a. from 9.5 to 12% by mass of Mg;
   b. from 0.012 to 0.8% by mass of Ti;
   c. from 0.003 to 0.08% by mass of Be;
   d. from 0.0005 to 0.08% by mass of Mn;
   e. from 0.001 to 0.1% by mass of Fe;
   f. from 0.0009 to 0.2% by mass of B;
   g. from 0.03 to 0.5% by mass of Si, preferably from 0.003 to 0.3% by mass;
   h. 0.01% by mass or less of Cu; and
   i. 0.01% by mass or less of Zn;
   with the balance being Al;
   each in relation to the total mass of the alloy composition, and wherein all compounds of the alloy add up to a total of 100% by mass; wherein the aluminum alloy comprises inevitable impurities, preferably wherein the inevitable impurities are present in an amount of less than 0.15% by mass, preferably in an amount of less than 0.1% by mass, further preferably in an amount of less than 0.05% by mass, and each individual impurity is present in an amount of less than 0.05% by mass, preferably in an amount of less than 0.01% by mass, further preferably in an amount of less than 0.001% by mass.

22. The aluminum alloy according to any one of items 1 to 16, comprising
   a. from 10.2 to 11.8% by mass of Mg;
   b. from 0.012 to 0.8% by mass of Ti;
   c. from 0.001 to 0.1% by mass of Be;
   d. 0.1% by mass or less of Mn;
   e. 0.1% by mass or less of Fe;
   f. from 0.0009 to 0.2% by mass of B;
   g. 1% by mass or less of Si;
   h. 0.01% by mass or less of Cu; and
   i. 0.01% by mass or less of Zn;
   with the balance being Al;
   each in relation to the total mass of the alloy composition, and wherein all compounds of the alloy add up to a total of 100% by mass; wherein the aluminum alloy comprises inevitable impurities, preferably wherein the inevitable impurities are present in an amount of less than 0.15% by mass, preferably in an amount of less than 0.1% by mass, further preferably in an amount of less than 0.05% by mass, and each individual impurity is present in an amount of less than 0.05% by mass, preferably in an amount of less than 0.01% by mass, further preferably in an amount of less than 0.001% by mass.

23. The aluminum alloy according to any one of items 1 to 16, comprising
   a. from 10.2 to 11.8% by mass of Mg;
   b. from 0.012 to 0.8% by mass of Ti;
   c. from 0.001 to 0.1% by mass of Be;
   d. 0.1% by mass or less of Mn;
   e. 0.1% by mass or less of Fe;
   f. from 0.0009 to 0.2% by mass of B;
   g. 0.5% by mass or less of Si, preferably in an amount of 0.2% by mass or less;
   h. 0.01% by mass or less of Cu; and
   i. 0.01% by mass or less of Zn;
   with the balance being Al;
   each in relation to the total mass of the alloy composition, and wherein all compounds of the alloy add up to a total of 100% by mass; wherein the aluminum alloy comprises inevitable impurities, preferably wherein the inevitable impurities are present in an amount of less than 0.15% by mass, preferably in an amount of less than 0.1% by mass, further preferably in an amount of less than 0.05% by mass, and each individual impurity is present in an amount of less than 0.05% by mass, preferably in an amount of less than 0.01% by mass, further preferably in an amount of less than 0.001% by mass.

24. The aluminum alloy according to any one of items 1 to 16, comprising
   a. from 10.2 to 11.8% by mass of Mg;
   b. from 0.012 to 0.8% by mass of Ti;
   c. from 0.003 to 0.08% by mass of Be;
   d. from 0.0005 to 0.08% by mass of Mn;
   e. 0.1% by mass or less of Fe;
   f. from 0.0009 to 0.2% by mass of B;
   g. 0.5% by mass or less of Si, preferably in an amount of 0.2% by mass or less;
   h. 0.01% by mass or less of Cu; and
   i. 0.01% by mass or less of Zn;
   with the balance being Al;
   each in relation to the total mass of the alloy composition, and wherein all compounds of the alloy add up to a total of 100% by mass; wherein the aluminum alloy comprises inevitable impurities, preferably wherein the inevitable impurities are present in an amount of less than 0.15% by mass, preferably in an amount of less than 0.1% by mass, further preferably in an amount of less than 0.05% by mass, and each individual impurity is present in an amount of less than 0.05% by mass, preferably in an amount of less than 0.01% by mass, further preferably in an amount of less than 0.001% by mass.

25. The aluminum alloy according to any one of items 1 to 16, comprising
   a. from 10.2 to 11.8% by mass of Mg;
   b. from 0.012 to 0.8% by mass of Ti;
   c. from 0.003 to 0.08% by mass of Be;
   d. from 0.0005 to 0.08% by mass of Mn;
   e. from 0.001 to 0.1% by mass of Fe;
   f. from 0.0009 to 0.2% by mass of B;
   g. from 0.03 to 0.5% by mass of Si, preferably from 0.003 to 0.15% by mass;
   h. 0.01% by mass or less of Cu; and
   i. 0.01% by mass or less of Zn;
   with the balance being Al;
   each in relation to the total mass of the alloy composition, and wherein all compounds of the alloy add up to a total of 100% by mass; wherein the aluminum alloy comprises inevitable impurities, preferably wherein the inevitable impurities are present in an amount of less than 0.15% by mass, preferably in an amount of less than 0.1% by mass, further preferably in an amount of less than 0.05% by mass, and each individual impurity is present in an amount of less than 0.05% by mass, preferably in an amount of less than 0.01% by mass, further preferably in an amount of less than 0.001% by mass.

26. The aluminum alloy according to any one of items 1 to 16, comprising
   a. from 10.2 to 11.8% by mass of Mg;
   b. from 0.013 to 0.5% by mass of Ti;
   c. from 0.001 to 0.1% by mass of Be;
   d. 0.1% by mass or less of Mn;
   e. 0.1% by mass or less of Fe;

f. from 0.0009 to 0.2% by mass of B;
g. 1% by mass or less of Si;
h. 0.01% by mass or less of Cu; and
i. 0.01% by mass or less of Zn;
with the balance being Al;
each in relation to the total mass of the alloy composition, and wherein all compounds of the alloy add up to a total of 100% by mass; wherein the aluminum alloy comprises inevitable impurities, preferably wherein the inevitable impurities are present in an amount of less than 0.15% by mass, preferably in an amount of less than 0.1% by mass, further preferably in an amount of less than 0.05% by mass, and each individual impurity is present in an amount of less than 0.05% by mass, preferably in an amount of less than 0.01% by mass, further preferably in an amount of less than 0.001% by mass.

27. The aluminum alloy according to any one of items 1 to 16, comprising
a. from 10.2 to 11.8% by mass of Mg;
b. from 0.013 to 0.5% by mass of Ti;
c. from 0.001 to 0.1% by mass of Be;
d. 0.1% by mass or less of Mn;
e. 0.1% by mass or less of Fe;
f. from 0.0009 to 0.2% by mass of B;
g. 0.5% by mass or less of Si, preferably in an amount of 0.2% by mass or less;
h. 0.01% by mass or less of Cu; and
i. 0.01% by mass or less of Zn;
with the balance being Al;
each in relation to the total mass of the alloy composition, and wherein all compounds of the alloy add up to a total of 100% by mass; wherein the aluminum alloy comprises inevitable impurities, preferably wherein the inevitable impurities are present in an amount of less than 0.15% by mass, preferably in an amount of less than 0.1% by mass, further preferably in an amount of less than 0.05% by mass, and each individual impurity is present in an amount of less than 0.05% by mass, preferably in an amount of less than 0.01% by mass, further preferably in an amount of less than 0.001% by mass.

28. The aluminum alloy according to any one of items 1 to 16, comprising
a. from 10.2 to 11.8% by mass of Mg;
b. from 0.013 to 0.5% by mass of Ti;
c. from 0.003 to 0.08% by mass of Be;
d. from 0.0005 to 0.08% by mass of Mn;
e. 0.1% by mass or less of Fe;
f. from 0.0009 to 0.2% by mass of B;
g. 0.5% by mass or less of Si, preferably in an amount of 0.2% by mass or less;
h. 0.01% by mass or less of Cu; and
i. 0.01% by mass or less of Zn;
with the balance being Al;
each in relation to the total mass of the alloy composition, and wherein all compounds of the alloy add up to a total of 100% by mass; wherein the aluminum alloy comprises inevitable impurities, preferably wherein the inevitable impurities are present in an amount of less than 0.15% by mass, preferably in an amount of less than 0.1% by mass, further preferably in an amount of less than 0.05% by mass, and each individual impurity is present in an amount of less than 0.05% by mass, preferably in an amount of less than 0.01% by mass, further preferably in an amount of less than 0.001% by mass.

29. The aluminum alloy according to any one of items 1 to 16, comprising
a. from 10.2 to 11.8% by mass of Mg;
b. from 0.013 to 0.5% by mass of Ti;
c. from 0.003 to 0.08% by mass of Be;
d. from 0.0005 to 0.08% by mass of Mn;
e. from 0.001 to 0.1% by mass of Fe;
f. from 0.0009 to 0.2% by mass of B;
g. from 0.03 to 0.5% by mass of Si, preferably from 0.003 to 0.15% by mass;
h. 0.01% by mass or less of Cu; and
i. 0.01% by mass or less of Zn;
with the balance being Al;
each in relation to the total mass of the alloy composition, and wherein all compounds of the alloy add up to a total of 100% by mass; wherein the aluminum alloy comprises inevitable impurities, preferably wherein the inevitable impurities are present in an amount of less than 0.15% by mass, preferably in an amount of less than 0.1% by mass, further preferably in an amount of less than 0.05% by mass, and each individual impurity is present in an amount of less than 0.05% by mass, preferably in an amount of less than 0.01% by mass, further preferably in an amount of less than 0.001% by mass.

30. The aluminum alloy according to any one of items 1 to 16, comprising
a. from 9.6 to 10.2% by mass of Mg;
b. from 0.012 to 0.8% by mass of Ti;
c. from 0.001 to 0.1% by mass of Be;
d. 0.1% by mass or less of Mn;
e. 0.1% by mass or less of Fe;
f. from 0.0009 to 0.2% by mass of B;
g. 1% by mass or less of Si;
h. 0.01% by mass or less of Cu; and
i. 0.01% by mass or less of Zn;
with the balance being Al;
each in relation to the total mass of the alloy composition, and wherein all compounds of the alloy add up to a total of 100% by mass; wherein the aluminum alloy comprises inevitable impurities, preferably wherein the inevitable impurities are present in an amount of less than 0.15% by mass, preferably in an amount of less than 0.1% by mass, further preferably in an amount of less than 0.05% by mass, and each individual impurity is present in an amount of less than 0.05% by mass, preferably in an amount of less than 0.01% by mass, further preferably in an amount of less than 0.001% by mass.

31. The aluminum alloy according to any one of items 1 to 16, comprising
a. from 9.6 to 10.2% by mass of Mg;
b. from 0.012 to 0.8% by mass of Ti;
c. from 0.001 to 0.1% by mass of Be;
d. 0.1% by mass or less of Mn;
e. 0.1% by mass or less of Fe;
f. from 0.0009 to 0.2% by mass of B;
g. 0.5% by mass or less of Si, preferably in an amount of 0.2% by mass or less;
h. 0.01% by mass or less of Cu; and
i. 0.01% by mass or less of Zn;
with the balance being Al;
each in relation to the total mass of the alloy composition, and wherein all compounds of the alloy add up to a total of 100% by mass; wherein the aluminum alloy comprises inevitable impurities, preferably wherein the inevitable impurities are present in an amount of less than 0.15% by mass, preferably in an amount of less than 0.1% by mass, further preferably in an amount of less than 0.05% by mass, and each individual impurity is present in an amount of less than 0.05% by mass, preferably in an amount of less than 0.01% by mass, further preferably in an amount of less than 0.001% by mass.

32. The aluminum alloy according to any one of items 1 to 16, comprising
   a. from 9.6 to 10.2% by mass of Mg;
   b. from 0.012 to 0.8% by mass of Ti;
   c. from 0.003 to 0.08% by mass of Be;
   d. from 0.0005 to 0.08% by mass of Mn;
   e. 0.1% by mass or less of Fe;
   f. from 0.0009 to 0.2% by mass of B;
   g. 0.5% by mass or less of Si, preferably in an amount of 0.2% by mass or less;
   h. 0.01% by mass or less of Cu; and
   i. 0.01% by mass or less of Zn;
   with the balance being Al;
   each in relation to the total mass of the alloy composition, and wherein all compounds of the alloy add up to a total of 100% by mass; wherein the aluminum alloy comprises inevitable impurities, preferably wherein the inevitable impurities are present in an amount of less than 0.15% by mass, preferably in an amount of less than 0.1% by mass, further preferably in an amount of less than 0.05% by mass, and each individual impurity is present in an amount of less than 0.05% by mass, preferably in an amount of less than 0.01% by mass, further preferably in an amount of less than 0.001% by mass.

33. The aluminum alloy according to any one of items 1 to 16, comprising
   a. from 9.6 to 10.2% by mass of Mg;
   b. from 0.012 to 0.8% by mass of Ti;
   c. from 0.003 to 0.08% by mass of Be;
   d. from 0.0005 to 0.08% by mass of Mn;
   e. from 0.001 to 0.1% by mass of Fe;
   f. from 0.0009 to 0.2% by mass of B;
   g. from 0.03 to 0.5% by mass of Si, preferably from 0.003 to 0.15% by mass;
   h. 0.01% by mass or less of Cu; and
   i. 0.01% by mass or less of Zn;
   with the balance being Al;
   each in relation to the total mass of the alloy composition, and wherein all compounds of the alloy add up to a total of 100% by mass; wherein the aluminum alloy comprises inevitable impurities, preferably wherein the inevitable impurities are present in an amount of less than 0.15% by mass, preferably in an amount of less than 0.1% by mass, further preferably in an amount of less than 0.05% by mass, and each individual impurity is present in an amount of less than 0.05% by mass, preferably in an amount of less than 0.01% by mass, further preferably in an amount of less than 0.001% by mass.

34. The aluminum alloy according to any one of items 1 to 16, comprising
   a. from 9.6 to 10.2% by mass of Mg;
   b. from 0.013 to 0.5% by mass of Ti;
   c. from 0.001 to 0.1% by mass of Be;
   d. 0.1% by mass or less of Mn;
   e. 0.1% by mass or less of Fe;
   f. from 0.0009 to 0.2% by mass of B;
   g. 1% by mass or less of Si;
   h. 0.01% by mass or less of Cu; and
   i. 0.01% by mass or less of Zn;
   with the balance being Al;
   each in relation to the total mass of the alloy composition, and wherein all compounds of the alloy add up to a total of 100% by mass; wherein the aluminum alloy comprises inevitable impurities, preferably wherein the inevitable impurities are present in an amount of less than 0.15% by mass, preferably in an amount of less than 0.1% by mass, further preferably in an amount of less than 0.05% by mass, and each individual impurity is present in an amount of less than 0.05% by mass, preferably in an amount of less than 0.01% by mass, further preferably in an amount of less than 0.001% by mass.

35. The aluminum alloy according to any one of items 1 to 16, comprising
   a. from 9.6 to 10.2% by mass of Mg;
   b. from 0.013 to 0.5% by mass of Ti;
   c. from 0.001 to 0.1% by mass of Be;
   d. 0.1% by mass or less of Mn;
   e. 0.1% by mass or less of Fe;
   f. from 0.0009 to 0.2% by mass of B;
   g. 0.5% by mass or less of Si, preferably in an amount of 0.2% by mass or less;
   h. 0.01% by mass or less of Cu; and
   i. 0.01% by mass or less of Zn;
   with the balance being Al;
   each in relation to the total mass of the alloy composition, and wherein all compounds of the alloy add up to a total of 100% by mass; wherein the aluminum alloy comprises inevitable impurities, preferably wherein the inevitable impurities are present in an amount of less than 0.15% by mass, preferably in an amount of less than 0.1% by mass, further preferably in an amount of less than 0.05% by mass, and each individual impurity is present in an amount of less than 0.05% by mass, preferably in an amount of less than 0.01% by mass, further preferably in an amount of less than 0.001% by mass.

36. The aluminum alloy according to any one of items 1 to 16, comprising
   a. from 9.6 to 10.2% by mass of Mg;
   b. from 0.013 to 0.5% by mass of Ti;
   c. from 0.003 to 0.08% by mass of Be;
   d. from 0.0005 to 0.08% by mass of Mn;
   e. 0.1% by mass or less of Fe;
   f. from 0.0009 to 0.2% by mass of B;
   g. 0.5% by mass or less of Si, preferably in an amount of 0.2% by mass or less;
   h. 0.01% by mass or less of Cu; and
   i. 0.01% by mass or less of Zn;
   with the balance being Al;
   each in relation to the total mass of the alloy composition, and wherein all compounds of the alloy add up to a total of 100% by mass; wherein the aluminum alloy comprises inevitable impurities, preferably wherein the inevitable impurities are present in an amount of less than 0.15% by mass, preferably in an amount of less than 0.1% by mass, further preferably in an amount of less than 0.05% by mass, and each individual impurity is present in an amount of less than 0.05% by mass, preferably in an amount of less than 0.01% by mass, further preferably in an amount of less than 0.001% by mass.

37. The aluminum alloy according to any one of items 1 to 16, comprising
   a. from 9.6 to 10.2% by mass of Mg;
   b. from 0.013 to 0.5% by mass of Ti;

c. from 0.003 to 0.08% by mass of Be;
d. from 0.0005 to 0.08% by mass of Mn;
e. from 0.001 to 0.1% by mass of Fe;
f. from 0.0009 to 0.2% by mass of B;
g. from 0.03 to 0.5% by mass of Si, preferably from 0.003 to 0.15% by mass;
h. 0.01% by mass or less of Cu; and
i. 0.01% by mass or less of Zn;
with the balance being Al;
each in relation to the total mass of the alloy composition, and wherein all compounds of the alloy add up to a total of 100% by mass; wherein the aluminum alloy comprises inevitable impurities, preferably wherein the inevitable impurities are present in an amount of less than 0.15% by mass, preferably in an amount of less than 0.1% by mass, further preferably in an amount of less than 0.05% by mass, and each individual impurity is present in an amount of less than 0.05% by mass, preferably in an amount of less than 0.01% by mass, further preferably in an amount of less than 0.001% by mass.

38. Method for the preparation of an aluminum alloy according to any one of items 1 to 37, comprising the steps of
a. Providing a raw aluminum;
b. Heating the raw aluminum to a temperature in the range of from 650 to 800° C., preferably from 700 to 770° C.;
c. Adding Mg and Be to result in a raw alloy;
d. Optionally degassing the raw alloy;
e. Adding Ti to the optionally degassed raw alloy to prepare the aluminum alloy.

39. Method for the preparation of an aluminum alloy according to any one of items 1 to 37, comprising the steps of
a. Providing a raw aluminum;
b. Heating the raw aluminum to a temperature in the range of from 650 to 800° C., preferably from 700 to 770° C.;
c. Adding Mg and Be to result in a raw alloy;
d. Optionally degassing the raw alloy;
e. Adding Ti and B to the optionally degassed raw alloy to prepare the aluminum alloy.

40. The method according to items 38 or 39, wherein the method further comprises an additive manufacture of a workpiece, wherein the additive manufacture of the workpiece comprises the steps of
f. Setting a layer of aluminum powder comprising an aluminum alloy according to any one of the items 1 to 16, preferably in vacuo or an inert gas atmosphere;
g. Selectively melting the powder by using at least one laser beam;
h. Iterating steps f. and g. until the workpiece is finished;
i. Optionally treating the workpiece by blasting, machining, heat and/or other treatments.

41. Method for the additive manufacture of a workpiece comprising the steps of
a. Setting a layer of aluminum powder comprising an aluminum alloy according to any one of the items 1 to 16, preferably in vacuo or an inert gas atmosphere;
b. Selectively melting the powder by using at least one laser beam;
c. Iterating steps a. and b. until the workpiece is finished;
d. Optionally treating the workpiece by blasting, machining, heat and/or other treatments.

42. The method according to item 40, wherein the workpiece is heat treated in step i. by heating the workpiece to a temperature of at least 380° C., or at least 400° C., or at least 430° C., or at least 450° C., for a period of less than 1 hour, or less than 3 hours, or less than 5 hours, or less than 8 hours, or less than 12 hours, or less than 18 hours, or less than 24 hours, preferably less than 12 hours, or preferably less than 18 hours, or for a period of at least 10 minutes, or at least 1 hour, or at least 3 hours, or at least 8 hours, or at least 12 hours, or at least 24 hours, and then cooled in air at ambient temperature.

43. The method according to item 41, wherein the workpiece is heat treated in step d. by heating the workpiece to a temperature of at least 380° C., or at least 400° C., or at least 430° C., or at least 450° C., for a period of less than 1 hour, or less than 3 hours, or less than 5 hours, or less than 8 hours, or less than 12 hours, or less than 18 hours, or less than 24 hours, preferably less than 12 hours, or preferably less than 18 hours, or for a period of at least 10 minutes, or at least 1 hour, or at least 3 hours, or at least 8 hours, or at least 12 hours, or at least 24 hours, and then cooled in air at ambient temperature.

44. Use of an aluminum alloy according to any one of items 1 to 37 in an additive manufacturing process.

45. The method according to any one of items 40 to 43, wherein the additive manufacturing process is selected from the group consisting of selective laser sintering (SLS), selective laser melting (SLM), direct metal laser sintering, and laser metal deposition (LMD).

46. The method according to item 45, wherein the additive manufacturing process is selective laser sintering, or selective laser melting.

47. Aluminum alloy product prepared by a method according to any one of items 40 to 43 and 45 to 46.

48. Aluminum alloy product comprising an aluminum alloy according to any one of items 1 to 37, and/or prepared by a method according to any one of items 40 to 43 and 45 to 46, wherein
i) at least parts of the product have a thickness in the range of from 1 to 23 mm, preferably 3 to 15 mm, preferably from 6 to 12 mm, preferably from 6 to 9 mm; or 1 to 10 mm, preferably 3 to 10 mm; and/or
ii) the aluminum of the product has a tensile strength of at least 290 MPa, preferably at least 320 MPa, preferably at least 360 MPa, preferably at least 370 MPa, preferably at least 380 MPa; and/or
iii) the aluminum of the product has a yield strength of at least 170 MPa, preferably at least 180 MPa, preferably at least 200 MPa, preferably at least 215 MPa; and/or
iv) the aluminum of the product has elongation of at least 5%, preferably at least 15%, preferably at least 20%, preferably at least 30%, preferably at least 34%.

49. The aluminum alloy product according to item 48, wherein
i) the aluminum of the product has a tensile strength, measured at a thickness of from 1 to 23 mm, preferably 3 to 15 mm, preferably from 6 to 12 mm, preferably from 6 to 9 mm; or 1 to 10 mm, preferably 3 to 10 mm, of at least 290 MPa, preferably at least 320 MPa, preferably at least 360 MPa, preferably at least 370 MPa, preferably at least 380 MPa; and/or
ii) the aluminum of the product has a yield strength, measured at a thickness of from 1 to 23 mm, preferably 3 to 15 mm, preferably from 6 to 12 mm, preferably from 6 to 9 mm; or 1 to 10 mm, preferably 3 to 10 mm, of at least 170 MPa, preferably at least 180 MPa, preferably at least 200 MPa, preferably at least 215 MPa; and/or
iii) the aluminum of the product has elongation, measured at a thickness of from 1 to 23 mm, preferably 3 to 15 mm, preferably from 6 to 12 mm, preferably from 6 to 9 mm; or 1 to 10 mm, preferably 3 to 10 mm, of at least 5%, preferably at least 15%, preferably at least 20%, preferably at least 30%, preferably at least 34%.

50. Aluminum alloy product comprising an aluminum alloy according to any one of items 1 to 29, and/or prepared by a method according to any one of items 40 to 43 and 45 to 46, wherein
   i) at least parts of the product have a thickness in the range of from 1 to 10 mm, preferably 3 to 10 mm, preferably from 6 to 9 mm; and/or
   ii) the aluminum of the product has a tensile strength of at least 380 MPa, preferably at least 400 MPa, preferably at least 420 MPa; and/or
   iii) the aluminum of the product has a yield strength of at least 200 MPa, preferably at least 215 MPa; and/or
   iv) the aluminum of the product has elongation of at least 20%, preferably at least 24%.

51. The aluminum alloy product according to item 50, wherein
   i) the aluminum of the product has a tensile strength, measured at a thickness of from 1 to 10 mm, preferably 3 to 10 mm, preferably from 6 to 9 mm, of at least 380 MPa, preferably at least 400 MPa, preferably at least 420 MPa; and/or
   ii) the aluminum of the product has a yield strength, measured at a thickness of from 1 to 10 mm, preferably 3 to 10 mm, preferably from 6 to 9 mm, of at least 200 MPa, preferably at least 215 MPa; and/or
   iii) the aluminum of the product has elongation, measured at a thickness of from 1 to 10 mm, preferably 3 to 10 mm, preferably from 6 to 9 mm, of at least 20%, preferably at least 24%.

52. Aluminum alloy product comprising an aluminum alloy according to any one of items 1 to 21 and 30 to 37, and/or prepared by a method according to any one of items 40 to 43 and 45 to 46, wherein
   i) at least parts of the product have a thickness in the range of from 1 to 23 mm, preferably 3 to 15 mm, preferably from 6 to 12 mm, preferably from 6 to 9 mm; and/or
   ii) the aluminum of the product has a tensile strength of at least 290 MPa, preferably at least 320 MPa, preferably at least 360 MPa, preferably at least 370 MPa, preferably at least 380 MPa; and/or
   iii) the aluminum of the product has a yield strength of at least 170 MPa, preferably at least 180 MPa; and/or
   iv) the aluminum of the product has elongation of at least 5%, preferably at least 15%, preferably at least 20%, preferably at least 30%, preferably at least 34%.

53. The aluminum alloy product according to item 52, wherein
   i) the aluminum of the product has a tensile strength, measured at a thickness of from 1 to 23 mm, preferably 3 to 15 mm, preferably from 6 to 12 mm, preferably from 6 to 9 mm, of at least 290 MPa, preferably at least 320 MPa, preferably at least 360 MPa, preferably at least 370 MPa, preferably at least 380 MPa; and/or
   ii) the aluminum of the product has a yield strength, measured at a thickness of from 1 to 23 mm, preferably 3 to 15 mm, preferably from 6 to 12 mm, preferably from 6 to 9 mm, of at least 170 MPa, preferably at least 180 MPa; and/or
   iii) the aluminum of the product has elongation, measured at a thickness of from 1 to 23 mm, preferably 3 to 15 mm, preferably from 6 to 12 mm, preferably from 6 to 9 mm, of at least 15%, preferably at least 20%, preferably at least 30%, preferably at least 34%.

The invention claimed is:

1. A method for the additive manufacture of a workpiece, comprising:
   a. providing a raw aluminum;
   b. heating the raw aluminum to a temperature in a range of from 650 to 800° C.;
   c. adding Mg and Be to result in a raw alloy;
   d. optionally degassing the raw alloy;
   e. adding Ti and B to an optionally degassed raw alloy to prepare the aluminum alloy
   f. setting a layer of aluminum powder comprising the aluminum alloy;
   g. selectively melting the aluminum powder by using at least one laser beam;
   h. iterating steps f. and g. until the workpiece is finished, wherein the aluminum alloy comprises:
   A. from 9 to 14% by mass of magnesium (Mg);
   B. from 0.15 to 1% by mass of titanium (Ti);
   C. from 0.0001 to 0.1% by mass of manganese (Mn);
   D. from 0 to 0.1% by mass of iron (Fe);
   E. from 0.001 to 0.1% by mass of beryllium (Be);
   F. from 0.0009 to 0.2% by mass of boron (B);
   G. from 0 to 1% by mass of silicon (Si);
   H. from 0 to 0.01% by mass of copper (Cu);
   I. from 0 to 0.01% by mass of zinc (Zn);
   J. from 0 to 0.05% by mass of scandium (Sc); and
   K. from 0 to 0.05% by mass of inevitable impurities;
   with the balance being aluminum (Al);
   wherein each is in relation to a total mass of the aluminum alloy, and wherein A.-K. and Al of the aluminum alloy add up to a total of 100% by mass.

2. The method according to claim 1, wherein the method further comprises
   i. treating the workpiece by blasting, machining, heat and/or other treatments.

3. The method according to claim 2, wherein the workpiece is heat treated in step i.
   by heating the workpiece at a temperature of at least 380° C.,
   for a period of at least 10 minutes to less than 24 hours, and
   then cooled in air at ambient temperature.

4. The method according to claim 1, wherein the additive manufacture is selected from the group consisting of selective laser sintering (SLS), selective laser melting (SLM), direct metal laser sintering, and laser metal deposition (LMD).

5. The method according to claim 4, wherein the additive manufacture is selective laser sintering or selective laser melting.

6. The method according to claim 1, wherein the aluminum alloy comprises Mg in an amount of from 9.1 to 13.9% by mass.

7. The method according to claim 1, wherein the aluminum alloy comprises Ti in an amount of from 0.2 to 0.9% by mass.

8. The method according to claim 1, wherein the aluminum alloy comprises Mn in an amount of 0.0005 to 0.09% by mass.

9. The method according to claim 1, wherein the aluminum alloy comprises Fe in an amount of 0.01 to 0.09% by mass.

10. The method according to claim 1, wherein the aluminum alloy comprises Be in an amount of from 0.002 to 0.09% by mass.

11. The method according to claim 1, wherein the aluminum alloy comprises B in an amount of from 0.001 to 0.15% by mass.

12. The method according to claim 1, wherein the aluminum alloy comprises Si in an amount of 0.01 to 0.5% by mass.

\* \* \* \* \*